United States Patent
Sugai et al.

(10) Patent No.: US 8,472,484 B2
(45) Date of Patent: Jun. 25, 2013

(54) SIGNAL PROCESSING CIRCUIT, INTERFACE UNIT, FRAME TRANSMISSION APPARATUS, AND SEGMENT DATA READING METHOD

(75) Inventors: Hidenori Sugai, Kawasaki (JP); Satoshi Nemoto, Kawasaki (JP); Hideo Abe, Kawasaki (JP); Hiroshi Tomonaga, Kawasaki (JP); Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/877,520

(22) Filed: Sep. 8, 2010

(65) Prior Publication Data
US 2011/0096790 A1    Apr. 28, 2011

(30) Foreign Application Priority Data
Sep. 9, 2009  (JP) .................................. 2009-208149

(51) Int. Cl.
*H04J 3/06* (2006.01)

(52) U.S. Cl.
USPC ........................................................ 370/516

(58) Field of Classification Search
None
See application file for complete search history.

(56) References Cited

U.S. PATENT DOCUMENTS

| | | | |
|---|---|---|---|
| 6,438,143 B1 * | 8/2002 | Higashida | 370/503 |
| 6,985,501 B2 * | 1/2006 | Suzuki et al. | 370/517 |
| 7,058,080 B1 * | 6/2006 | Yamada et al. | 370/466 |
| 7,120,171 B2 * | 10/2006 | Sasaki | 370/517 |
| 2007/0140398 A1 * | 6/2007 | Inoue et al. | 375/372 |
| 2008/0151897 A1 | 6/2008 | Nemoto et al. | |

FOREIGN PATENT DOCUMENTS

| | | |
|---|---|---|
| JP | 2004-104701 A | 4/2004 |
| JP | 2005-318075 A | 11/2005 |
| JP | 2008-160570 A | 7/2008 |

* cited by examiner

*Primary Examiner* — Anh-Vu Ly
(74) *Attorney, Agent, or Firm* — Fujitsu Patent Center

(57) ABSTRACT

A signal processing circuit for controlling reading of segment data from a buffer in which a plurality of segment data generated by dividing a frame and received via a plurality of switches which direct each of the segment data to a designated destination are stored, comprises: a start detecting unit which detects a starting segment representing the first transmitted segment data to the switch among the segment data received after the buffer has emptied; a transmission time acquiring unit which acquires a transmission time at which the starting segment was transmitted to the switch; and a read timing control unit which determines, based on the transmission time, a read timing for reading the segment data from the buffer.

8 Claims, 25 Drawing Sheets

FIG.4
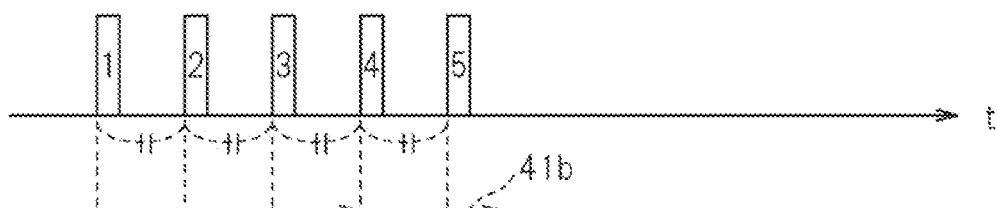
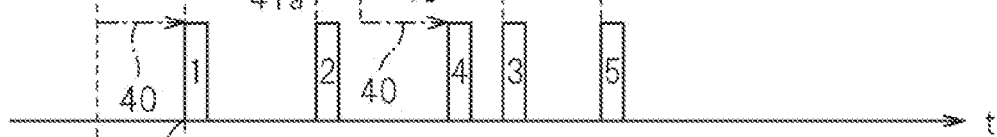
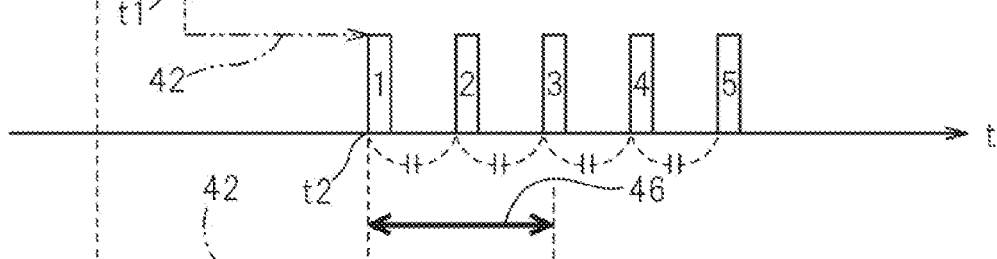
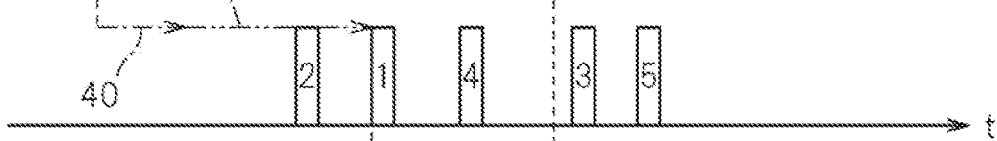
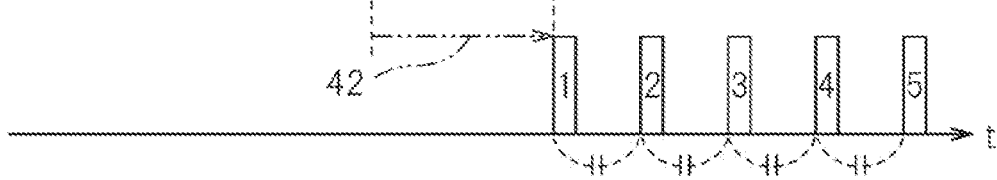

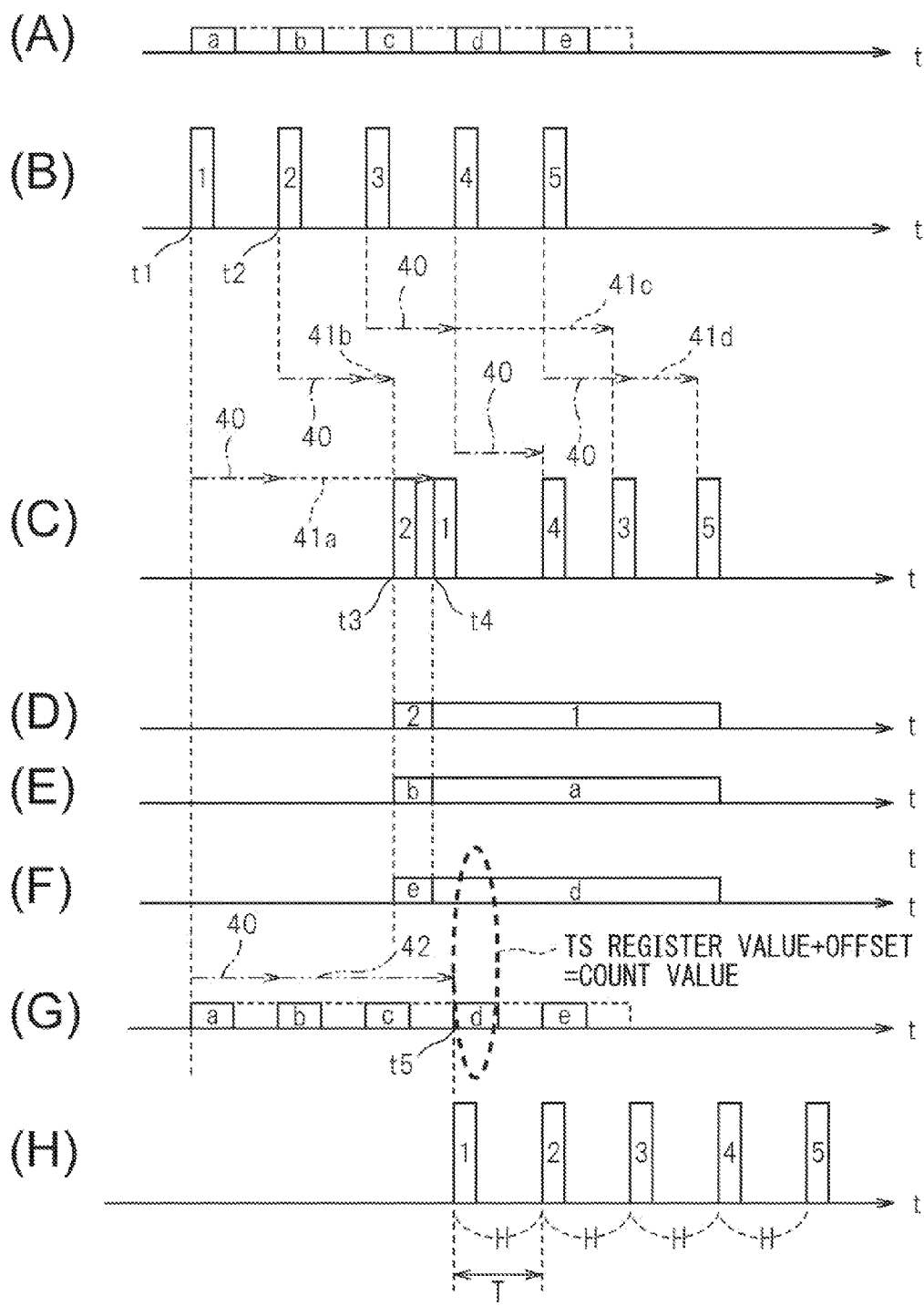

SIGNAL PROCESSING CIRCUIT, INTERFACE UNIT, FRAME TRANSMISSION APPARATUS, AND SEGMENT DATA READING METHOD

CROSS-REFERENCE TO RELATED APPLICATIONS

This application is based upon and claims the benefit of priority of the prior Japanese Patent Application No. 2009-208149, filed on Sep. 9, 2009, the entire contents of which are incorporated herein by reference.

FIELD

The embodiments discussed herein are related to frame data switching.

BACKGROUND

A packet relay apparatus that divides received packet data (hereinafter simply called the "packet") into a plurality of segment data and that switches the respective segment data using a plurality of switches according to the destination of the original packet is proposed.

FIG. 1 is a diagram schematically illustrating the configuration of a packet relay apparatus equipped with a plurality of switches. Reference numeral 200 is the packet relay apparatus, 210-1 to 210-n and 230-1 to 230-n are interface (IF) cards, and 220 is a switch card. Reference numerals 211-1 to 211-n are receiving units, 212-1 to 212-n are data segmenting units, and 221-1 to 221-m are the switches. Reference numerals 231-1 to 231-n are packet assembling units, and 232-1 to 232-n are transmitting units.

The packet relay apparatus 200 thus includes the n interface cards 210-1 to 210-n, the n interface cards 230-1 to 230-n, and the switch card 220. In the interface cards 210-1 to 210-n, the receiving units 211-1 to 211-n each receive a packet, and the data segmenting units 212-1 to 212-n each divide the packet into a plurality of segment data. Each of the data segmenting units 212-1 to 212-n distributes the segment data to the m switches 221-1 to 221-m mounted on the switch card 220.

Each of the switches 221-1 to 221-m transfers each incoming segment data to a corresponding one of the interface cards 230-1 to 230-n that is determined according to the destination of the original packet.

In the interface cards 230-1 to 230-n that received the segment data, the packet assembling units 231-1 to 231-n assemble the segment data into packets. The transmitting units 232-1 to 232-n transmit the packets.

A data receiving apparatus which includes: packet disassembling means for recovering transmission time information and voice or video encoded data by disassembling a packet received over a network; storage means for storing the transmission time information and encoded data recovered by the packet disassembling means; reference time generating means for generating a reference time signal which serves as a reference for determining a timing for reading out the encoded data stored in the storage means and a timing for calculating a relative delay fluctuation time that the received packet experienced during transmission over the network; read timing control means for controlling the read timing to read the encoded data from the storage means, based on the transmission time information stored in the storage means and the reference time signal generated by the reference time generating means; fluctuation time calculating means for calculating, based on the transmission time information recovered by the packet disassembling means and on the reference time signal, the relative delay fluctuation time that the received packet experienced during transmission over the network; smoothing means for smoothing the relative delay fluctuation times that the fluctuation time calculating means calculated for a plurality of received packets; timing adjusting means for monitoring the output of the smoothing means and, in accordance with the output, adjusting the reference time signal generated by the reference time generating means; and decoding means for decoding, in accordance with the reference time signal, the encoded data that has been read out of the storage means by the read timing supplied from the read timing control means is also proposed.

Further, a fluctuation absorbing apparatus which includes: a first queue which stores high priority packets; a second queue which stores packets other than the high priority packets; a classifier which determines whether an incoming packet is a high priority packet or not and which directs the incoming packet to a corresponding one of the first and second queues; a scheduler which externally outputs the packets stored in the first queue and the packets stored in the second queue so that the packets stored in the first queue are output in preference to the packets stored in the second queue; and a packet interval adjusting unit which adjusts the time interval at which the packets are output from the first queue is proposed.

Related art is disclosed in Japanese Laid-open Patent Publication No. 2008-160570, Japanese Laid-open Patent Publication No. 2004-104701 and Japanese Laid-open Patent Publication No. 2005-318075.

SUMMARY

According to one embodiment, a signal processing circuit for controlling reading of segment data from a buffer in which a plurality of segment data generated by dividing a frame and received via a plurality of switches which direct each of the segment data to a designated destination are stored is provided. The signal processing circuit includes: a start detecting unit which detects a starting segment representing the first transmitted segment data to the switch among the segment data received after the buffer has emptied; a transmission time acquiring unit which acquires a transmission time at which the starting segment was transmitted to the switch; and a read timing control unit which determines, based on the transmission time, a read timing for reading the segment data from the buffer.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWING(S)

FIG. 4A is an explanatory diagram of buffer residence time;

FIG. 4B is an explanatory diagram of buffer residence time;

FIG. 4C is an explanatory diagram of buffer residence time;

FIG. 4D is an explanatory diagram of buffer residence time;

FIG. 4E is an explanatory diagram of buffer residence time;

FIG. 26A is an explanatory diagram of the segment data reading method according to the embodiment disclosed herein.

FIG. 26B is an explanatory diagram of the segment data reading method according to the embodiment disclosed herein.

FIG. 26C is an explanatory diagram of the segment data reading method according to the embodiment disclosed herein.

FIG. 26D is an explanatory diagram of the segment data reading method according to the embodiment disclosed herein.

FIG. 26E is an explanatory diagram of the segment data reading method according to the embodiment disclosed herein.

FIG. 26F is an explanatory diagram of the segment data reading method according to the embodiment disclosed herein.

FIG. 26G is an explanatory diagram of the segment data reading method according to the embodiment disclosed herein.

FIG. 26H is an explanatory diagram of the segment data reading method according to the embodiment disclosed herein.

DESCRIPTION OF EMBODIMENT(S)

An embodiment of the present invention will be described below with reference to the accompanying drawings.

If frame data (hereinafter simply referred to as "frame") or a packet is divided into a plurality of segment data and switched using a plurality of different switches, the time taken to pass through the switch may vary from one switch to another due to such factors as the difference in load between the respective switches. As a result, the segment data may arrive at the destination interface card with varying time delays. Such variations in delay time may hereinafter be referred to as the "delay fluctuations." The delay fluctuations that the segment data experience by passing through the respective switches can be absorbed by providing a buffer for absorbing the delay fluctuations. A process for absorbing such delay fluctuations will be described below.

Figure 1:
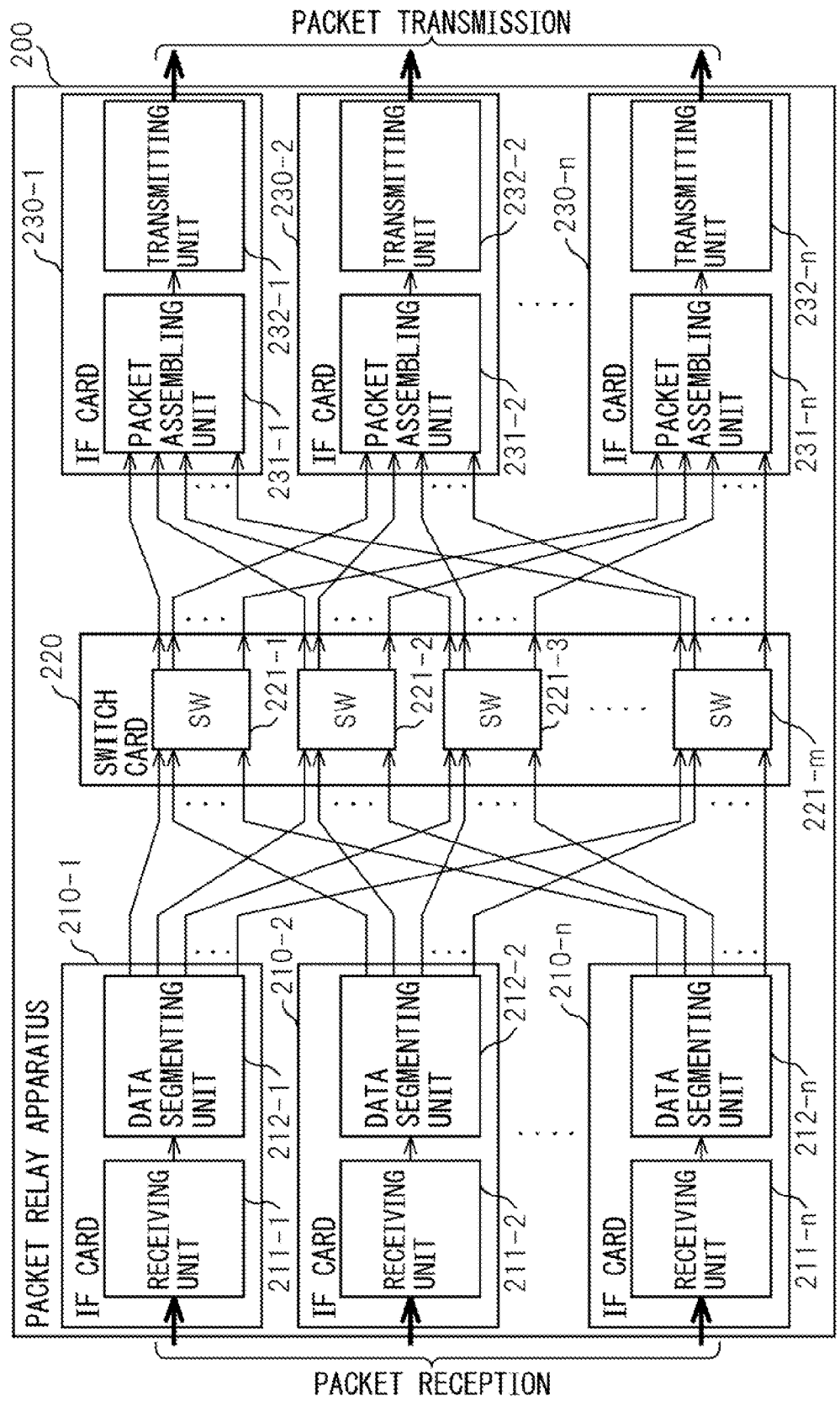
FIG. 1 is a diagram schematically illustrating the configuration of a packet relay apparatus equipped with a plurality of switches.
Figure 2:
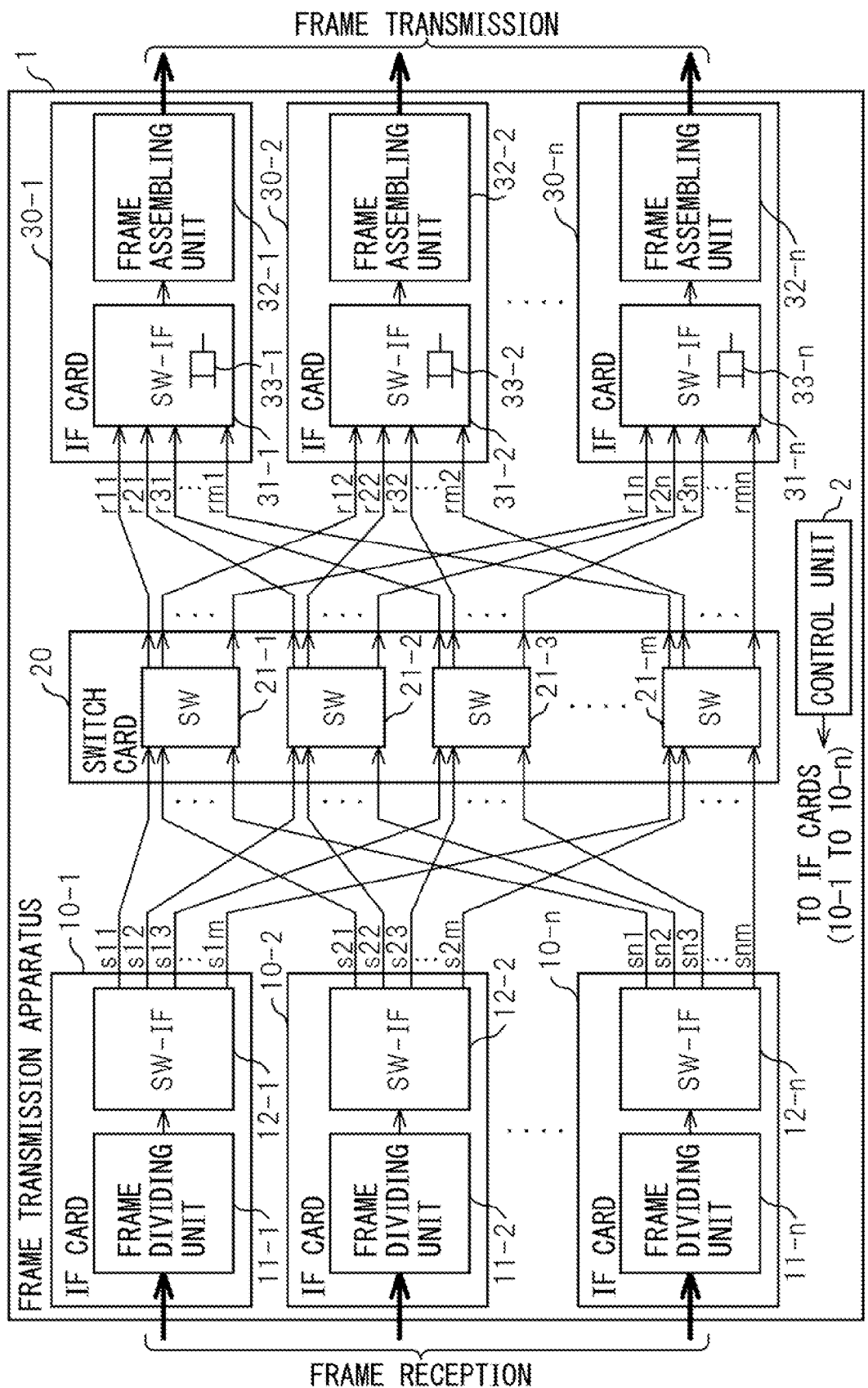
FIG. 2 is a diagram schematically illustrating the configuration of a first example of a frame transmission apparatus equipped with a plurality of switches.

FIG. 2 is a diagram schematically illustrating the configuration of a first example of a frame transmission apparatus equipped with a plurality of switches. The frame transmission apparatus 1 divides the received frame into a plurality of segment data, and switches the respective segment data using the plurality of switches according to the destination of the original frame.

Reference numeral 2 is a control unit, 10-1 to 10-*n* and 30-1 to 30-*n* are interface cards, and 20 is a switch card. Reference numerals 11-1 to 11-*n* are frame dividing units, 12-1 to 12-*n* and 31-1 to 31-*n* are switch interfaces (SW-IFs), 32-1 to 32-*n* are frame assembling units, and 21-1 to 21-*m* are the switches.

The frame transmission apparatus 1 thus includes the control unit 2, the n interface cards 10-1 to 10-*n* (hereinafter sometimes collectively referred to as the interface card 10), the switch card 20, and the n interface cards 30-1 to 30-*n* (hereinafter sometimes collectively referred to as the interface card 30).

The interface cards 10-1 to 10-*n* include the respective frame dividing units 11-1 to 11-*n* (hereinafter sometimes collectively referred to as the frame dividing unit 11) and the respective switch interfaces 12-1 to 12-*n* (hereinafter sometimes collectively referred to as the switch interface 12). Likewise, the interface cards 30-1 to 30-*n* include the respective switch interfaces 31-1 to 31-*n* (hereinafter sometimes collectively referred to as the switch interface 31) and the respective frame assembling units 32-1 to 32-*n* (hereinafter sometimes collectively referred to as the frame assembling unit 32). The switch card 20 includes the m switches 21-1 to 21-*m* (hereinafter sometimes collectively referred to as the switch 21).

The interface cards 10-1 and 30-1 may be combined into a single card. The same applies for the interface cards 10-1 and 30-2, . . . , 10-*n* and 30-*n*. In this case, the switch interfaces 12-1 and 31-1 may be mounted on the same unit. For example, the switch interfaces 12-1 and 31-1 may be mounted on the same circuit chip. The same applies for the switch interfaces 12-2 and 31-2, . . . , 12-*n* to 31-*n*.

Further, in the frame transmission apparatus 1, the plurality of switches 21 may be implemented by mounting the plurality of switches 21 on the switch card 20 or by providing as many switch cards 20 each mounted with one switch 21.

The frame dividing unit 11 divides each received frame into a plurality of segment data. The frames switched through the frame transmission apparatus 1 may be, for example, synchronous frames transmitted at a fixed transmission rate by assigning prescribed time slots in time-division multiplexed communications. Examples of such synchronous frames include ODU (Optical Data Unit) frames transferred over an OTN (Optical Transport Network). When the incoming frames are such synchronous frames, the function of the frame dividing unit 11 for dividing each frame into a plurality of segment data may be incorporated, for example, in a framer that demaps synchronous frames from the received signal.

The switch interface 12 appends header information to the segment data. The header information includes information for specifying the destination interface card 30 that is determined according to the destination of the original frame. The switch interface 12 may generate the information for specifying the destination interface card 30 according to the destination of the original frame, for example, in accordance with setting information predefined by the control unit 2.

The switch interface 12 distributes the segment data, with the header information appended thereto, to the switches 21-1 to 21-*m*. Reference numerals s11 to s1*m*, s21 to s2*m*, and sn1 to snm are signal lines for transferring the segment data from the switch interface 12 to the switch 21. In the description given herein, these signal lines may be referred to as the "lanes". Lane sij designates the lane for carrying the segment data from the switch interface 12-*i* to the switch 21-*j* (symbols i and j are suffixes).

The number of lanes connected from one individual switch interface 12 to the switch 21 may be greater than the total number of individual switches 21. That is, more than one lane may be used to transfer the segment data from one individual switch interface 12 to one individual switch 21.

The switch 21 switches the segment data based on the header information appended to the segment data. More specifically, the switch 21 transfers the segment data to the destination interface card 30 specified in the header information.

The switch interface 31 performs processing to terminate the header information appended to the received segment data. Reference numerals r11 to rm1, r12 to rm2, and r1*n* to rmn are signal lines for transferring the segment data from the switch 21 to the switch interface 31. Signal line rij designates the signal line for carrying the segment data from the switch 21-*i* to the switch interface 31-*j* (symbols i and j are suffixes).

Due to the earlier described delay fluctuations, the switch interface 31 may not necessarily be able to receive the segment data in the original order of the segment data. The switch interface 31 therefore performs reordering to reorder the output sequence of the segment data so that the segment data will be output to the frame assembling unit 32 in the original order of the segment data. The switch interfaces 31-1 to 31-*n* are equipped with reorder buffers 33-1 to 33-*n*, respectively, for storing the segment data during the reordering. The reorder buffers 33-1 to 33-*n* may hereinafter be referred to collectively as the reorder buffer 33.

The frame assembling unit 32 assembles the segment data into frames. The assembled frames are transmitted toward the next transmission apparatus. When the incoming frames are synchronous frames such as described earlier, the function of the frame assembling unit 32 for assembling the segment data into frames may be incorporated, for example, in a framer that maps synchronous frames to the transmit signal.

Figure 3:
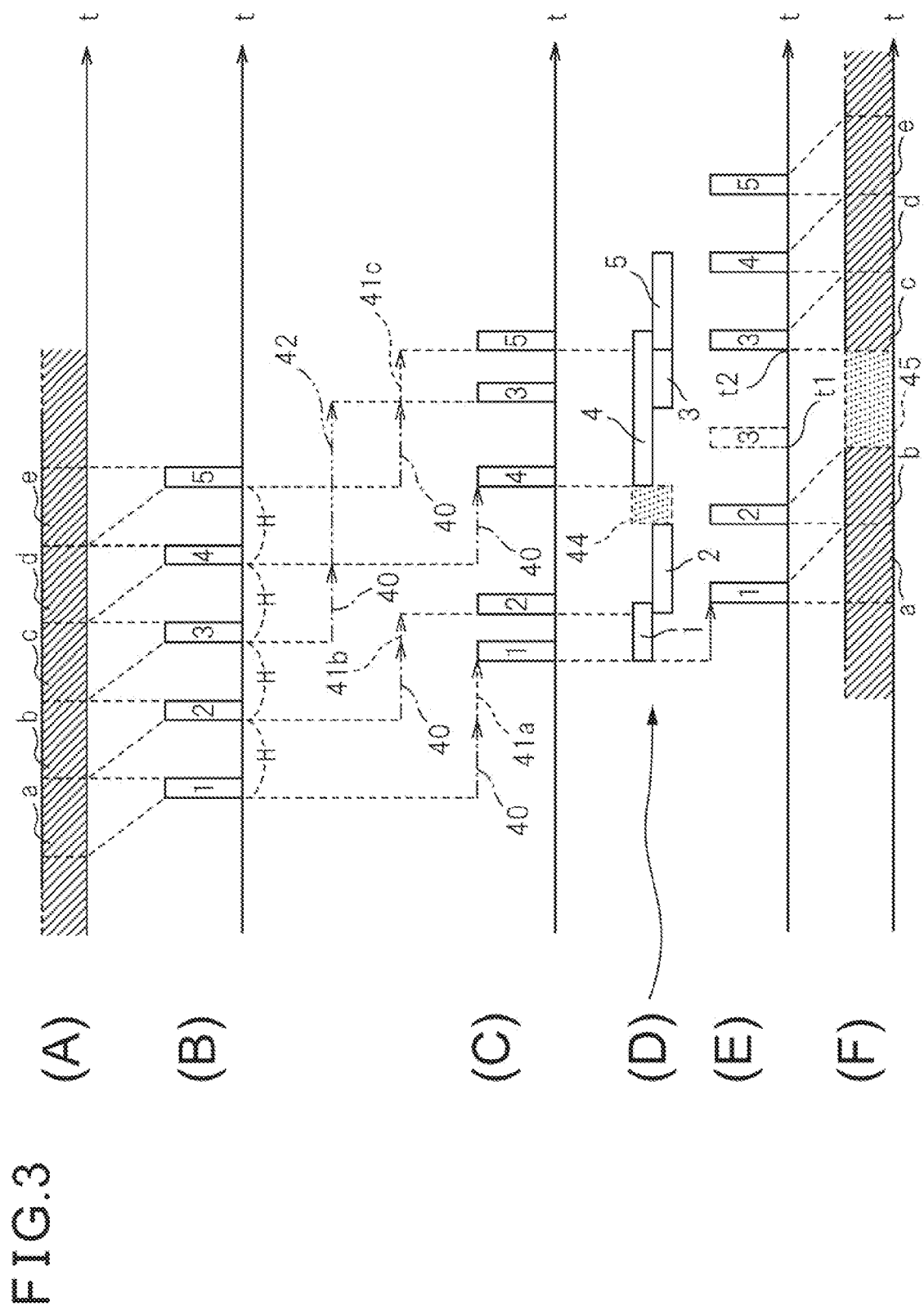
FIG. 3A is an explanatory diagram illustrating the delay fluctuations of segment data.
FIG. 3B is an explanatory diagram illustrating the delay fluctuations of segment data.
FIG. 3C is an explanatory diagram illustrating the delay fluctuations of segment data.
FIG. 3D is an explanatory diagram illustrating the delay fluctuations of segment data.
FIG. 3E is an explanatory diagram illustrating the delay fluctuations of segment data.
FIG. 3F is an explanatory diagram illustrating the delay fluctuations of segment data.

FIGS. 3A to 3F are explanatory diagrams illustrating the delay fluctuations that the segment data experience. FIG. 3A is a time chart depicting the frame input to the frame dividing unit 11, and FIG. 3B is a time chart depicting the segment data output from the switch interface 12.

FIG. 3C is a time chart depicting the segment data input to the switch interface 31, and FIG. 3D is a time chart depicting the segment data held in the reorder buffer 33.

FIG. 3E is a time chart depicting the segment data output from the switch interface 31 to the frame assembling unit 32, and FIG. 3F is a time chart depicting the segment data output from the frame assembling unit 32.

In FIG. 3A, the obliquely hatched area indicates the frame itself as it is input to the frame dividing unit 11. Portions "a" to "e" each indicate a portion that becomes one segment data when the frame is divided by the frame dividing unit 11.

The rectangles in FIG. 3B indicate the respective segment data output from the switch interface 12. The numbers in the rectangles indicate the order in which the respective segment data were segmented from the original frame; the segment data number is smaller for the segment data segmented from a portion nearer to the beginning of the original frame. In other drawings also, the same method of designation is used to designate the segment data. As depicted in FIG. 3B, the switch interface 12 transmits the segment data to the switch 21 at predetermined intervals of time in the same order in which the segment data were segmented from the original frame.

The rectangles in FIG. 3C indicate the segment data of FIG. 3B transmitted from the switch interface 12 and received at the switch interface 31. Semi-dashed arrow 40 indicates the minimum fixed delay time for the segment data transmitted from the switch interface 12 to arrive at the switch interface 31. Dashed arrows 41a to 41c each indicate the transmission delay fluctuation that the corresponding segment data experiences during the transmission from the switch interface 12 to the switch interface 31.

Double-dashed arrow 42 indicates the maximum transmission delay fluctuation that is expected to occur in the frame transmission apparatus 1 during the transmission from the switch interface 12 to the switch interface 31. The term "maximum fluctuation" refers to the value calculated by subtracting the fixed delay time from the maximum value of the transmission delay that is expected to occur in the frame transmission apparatus 1 during the transmission from the switch interface 12 to the switch interface 31. In other drawings, the same terminology is used to describe the transmission delay.

In the example of FIG. 3C, a delay of (fixed delay time 40)+(fluctuation 41a) has occurred in the first segment data. Similarly, a delay of (fixed delay time 40)+(fluctuation 41b) has occurred in the second segment data. A delay of (fixed delay time 40)+(maximum fluctuation 42) has occurred in the third segment data. A delay of (fixed delay time 40) has occurred in the fourth segment data. A delay of (fixed delay time 40)+(fluctuation 41c) has occurred in the fifth segment data.

The rectangles in FIG. 3D indicate the segment data stored in the reorder buffer 33. Since a delay equal to the maximum fluctuation 42 has occurred in the third segment data, as depicted in FIG. 3C, the data arrives late at the switch interface 31. In FIG. 3D, reference numeral 44 indicates the condition in which the reorder buffer 33 has emptied, i.e., a buffer underflow has occurred, due to the delayed arrival of the third segment data.

The rectangles in FIG. 3E indicate the segment data output from the switch interface 31 to the frame assembling unit 32. The switch interface 31 outputs the segment data at predetermined intervals of time at the same rate as the switch interface 12 outputs the data. Due to the underflow 44 that occurred in FIG. 3D, the switch interface 31 is unable to output the third segment data at the originally intended output timing t1, and outputs the third segment data at the next output timing t2.

In FIG. 3F, the obliquely hatched area indicates the frame itself as it is output from the frame assembling unit 32. Portions "a" to "e" indicate the portions that the first to fifth segment data respectively occupy in the assembled frame. Area 45 indicates the empty portion that occurs in the assembled frame due to the delayed arrival of the third segment data.

In certain fixed-rate signal transmission schemes, the presence of an empty portion such as the above portion 45 is not permitted in any transmit frame due to the transmission standard constraints. Examples of frames transmitted by such transmission schemes include OTN frames. If an empty portion occurs in any frame transmitted by such a transmission scheme, it may be determined that an out-of-synchronization error has occurred in the frame.

The segment data are output from the switch interface 12 at predetermined intervals of time. For any segment data, the maximum value of the transmission delay expected to occur until the data arrives at the switch interface 31 is estimated to be approximately equal to the sum of the fixed delay time 40 and the maximum fluctuation 42. Accordingly, if the timing to start reading the reorder buffer 33 is appropriately set when the switch interface 12 begins to transmit the segment data, a buffer underflow can be prevented.

There are two possible methods that can read the segment data from the reorder buffer 33 while preventing the occurrence of an underflow condition. In the first reading method, after a time equivalent to the maximum fluctuation has elapsed from the reception of the starting segment, the segment data are read out of the reorder buffer 33 at the same rate as the transmission rate of the segment data. The starting segment refers to the first transmitted segment data to the switch 21 among the segment data received after the reorder buffer 33 has emptied.

The delay fluctuation of each segment data is expected to be smaller than the maximum fluctuation. By determining the read timing as described above, the underflow of the reorder buffer 33 can be prevented because each segment data is read out of the reorder buffer 33 after the time equivalent to the maximum fluctuation expected for that segment data has elapsed.

FIGS. 4A to 4E are explanatory diagrams illustrating the residence time in the reorder buffer 33 according to the first reading method. FIG. 4A is a time chart depicting the segment data output from the switch interface 12, and FIG. 4B illustrates a first example of a time chart depicting the segment data input to the switch interface 31. FIG. 4C is a time chart depicting the segment data output from the switch interface 31 that received the segment data of FIG. 4B and input to the frame assembling unit 32.

FIG. 4D illustrates a second example of a time chart depicting the segment data input to the switch interface 31. FIG. 4E is a time chart depicting the segment data output from the switch interface 31 that received the segment data of FIG. 4D and input to the frame assembling unit 32.

In the first reading method, the read timing of each segment data is determined by the arrival time of the starting segment at the switch interface 31. Accordingly, when the first segment data as the starting segment arrives at time t1, as depicted in FIG. 4B, the switch interface 31 begins to output the segment data at time t2 after the time equivalent to the maximum fluctuation 42 has elapsed from time t1. This is illustrated in FIG. 4C.

A comparison is made between the example of the delay depicted in FIG. 4B and the example of the delay depicted in FIG. 4D. While only a delay of minimum fixed delay time 40 occurs in the first segment data depicted in FIG. 4B, a delay of (fixed delay time 40)+(maximum fluctuation 42) occurs in the first segment data depicted in FIG. 4D.

As a result, when a comparison is made between the outputs of the switch interface 31 depicted in FIGS. 4C and 4E, it is seen that the output timing in FIG. 4E is delayed with respect to the output timing in FIG. 4C by a period 46 equivalent to the maximum fluctuation 42. That is, according to the first reading method, the period of time that each segment data takes to pass through the reorder buffer 33 varies according to the variation in the delay experienced by the starting segment. Accordingly, the length of time that each segment data resides in the reorder buffer 33 may increase, depending on the amount of delay of the starting segment.

For example, in the case of a transmission apparatus that transmits OTN frames, the maximum allowable delay time is defined by the standard. As a result, if the residence time in the reorder buffer 33 increases, there is the problem that the design constraints of the transmission apparatus become more restricted.

In the second reading method, when the amount of data stored in the reorder buffer 33 has reached a predetermined level, the segment data are read out of the reorder buffer 33 at the same rate as the transmission rate of the segment data. The predetermined level is determined according to the amount of data to be read out of the reorder buffer 33 during the period equivalent to the maximum fluctuation 42.

Figure 5:
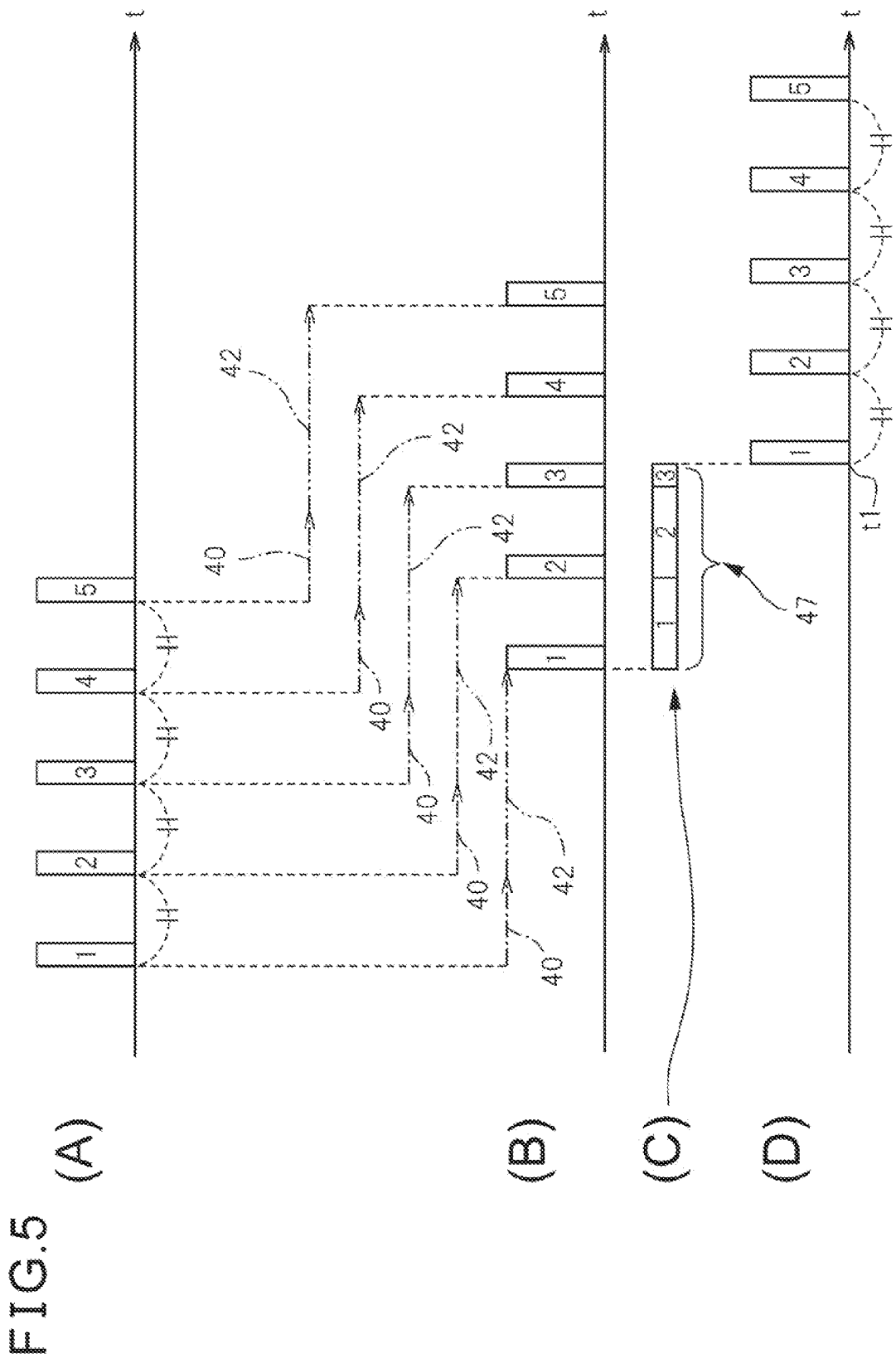
FIG. 5A is an explanatory diagram of buffer residence time.
FIG. 5B is an explanatory diagram of buffer residence time.
FIG. 5C is an explanatory diagram of buffer residence time.
FIG. 5D is an explanatory diagram of buffer residence time.

FIGS. 5A to 5D are diagrams illustrating the residence time in the reorder buffer 33 according to the second reading method. FIG. 5A is a time chart depicting the segment data output from the switch interface 12, and FIG. 5B is a time chart depicting the segment data input to the switch interface 31.

FIG. 5C illustrates the state of the reorder buffer 33 in which the segment data are stored, and FIG. 5D is a time chart depicting the segment data output from the switch interface 31 that received the segment data of FIG. 5B and input to the frame assembling unit 32.

Reference numeral 47 in FIG. 5C indicates the amount of data to be read out of the reorder buffer 33 during the period equivalent to the maximum fluctuation 42. According to the second reading method, the switch interface 31 begins to output the segment data at time t1 when the amount of data stored in the reorder buffer 33 has reached the predetermined level 47. This is illustrated in FIGS. 5C and 5D.

In the example of the delay depicted in FIG. 5B, a delay of (fixed delay time 40)+(maximum fluctuation 42) occurs in any one of the first to fifth segment data. In this way, if the amount of delay of the segment data received until the amount of data stored in the reorder buffer 33 reaches the predetermined level 47 is large, the residence time in the reorder buffer 33 increases even when the second reading method is employed.

Figure 6:
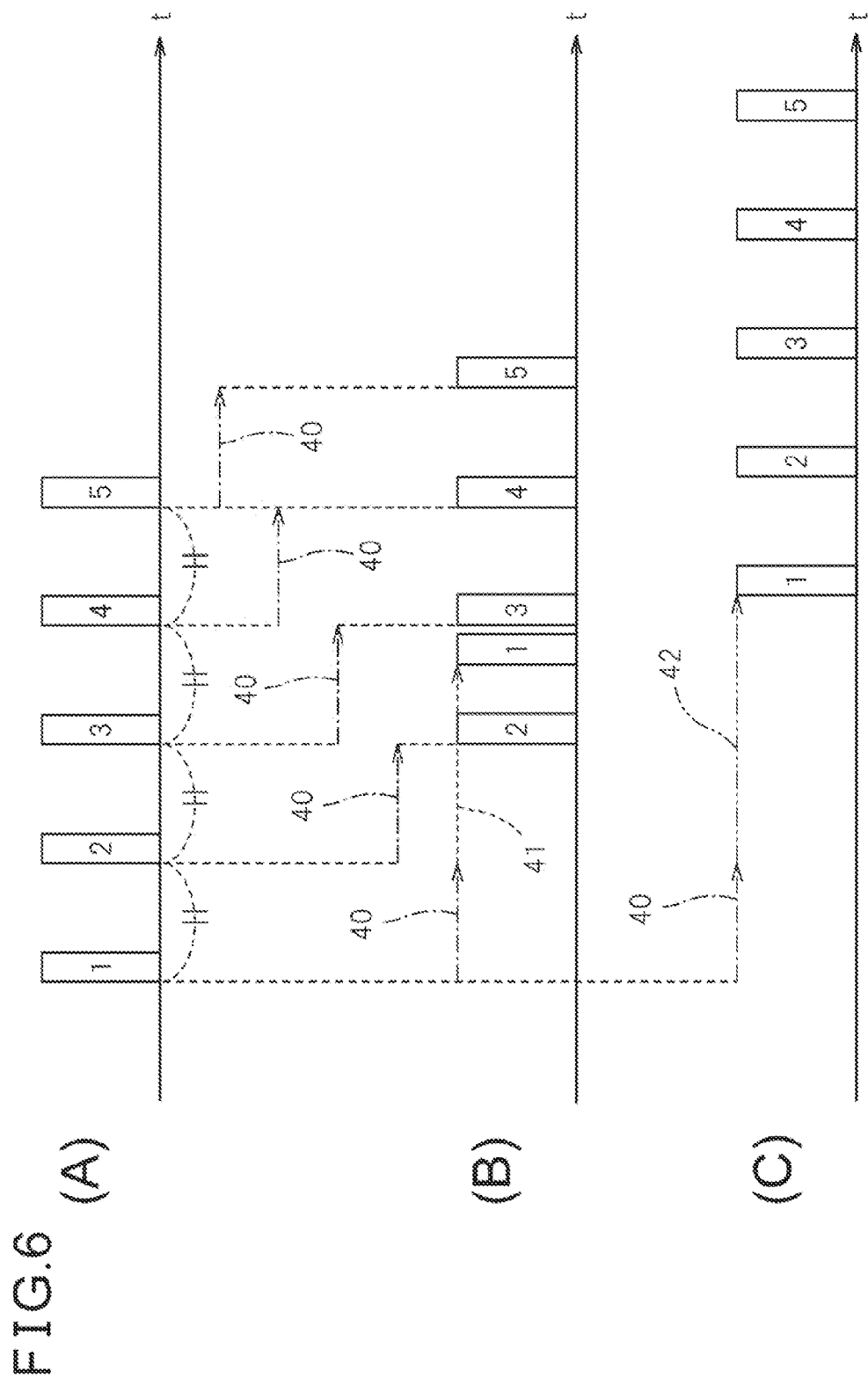
FIG. 6A is an explanatory diagram of a segment data reading method according to the embodiment disclosed herein.
FIG. 6B is an explanatory diagram of a segment data reading method according to the embodiment disclosed herein.
FIG. 6C is an explanatory diagram of a segment data reading method according to the embodiment disclosed herein.

FIGS. 6A to 6C are explanatory diagrams of a segment data reading method according to the embodiment disclosed herein. FIG. 6A is a time chart depicting the segment data output from the switch interface 12, and FIG. 6B is a time chart depicting the segment data input to the switch interface 31. FIG. 6C is a time chart depicting the segment data output from the switch interface 31 that received the segment data of FIG. 6B and input to the frame assembling unit 32.

According to the reading method of the embodiment, the time at which the switch interface 31 reads each segment data from the reorder buffer 33 is determined according to the time at which the switch interface 12 transmitted the starting segment to the switch 21. For example, in FIGS. 6A to 6C, it is assumed that the starting segment is the first segment data. In the example depicted in FIG. 6C, the switch interface 31 begins to read the segment data after a period equivalent to (fixed delay time 40)+(maximum fluctuation 42) has elapsed from the time at which the switch interface 12 transmitted the first segment data to the switch 21.

According to the reading method of the embodiment, the read timing is not determined by reference to the arrival time of the segment data at the switch interface 31. As a result, if, for example, the arrival of the first segment data is delayed, the problem that the residence time in the reorder buffer 33 increases, as in the first reading method, does not occur with the method of the embodiment. Likewise, the problem that the residence time in the reorder buffer 33 increases, such as occurs with the second method, does not occur with the method of the embodiment.

Next, referring to FIGS. 7A to 7D and FIGS. 8A to 8E, a description will be given of how the residence time in the reorder buffer 33 can be reduced by the reading method of the embodiment as compared with the first and second reading methods. In the following description, it is assumed that the starting segment is the first segment data. Further, in the following example, the switch interface 31 implementing the reading method of the embodiment begins to read the segment data after the period equivalent to (fixed delay time 40)+(maximum fluctuation 42) has elapsed from the time at which the switch interface 12 transmitted the starting segment.

Figure 7:
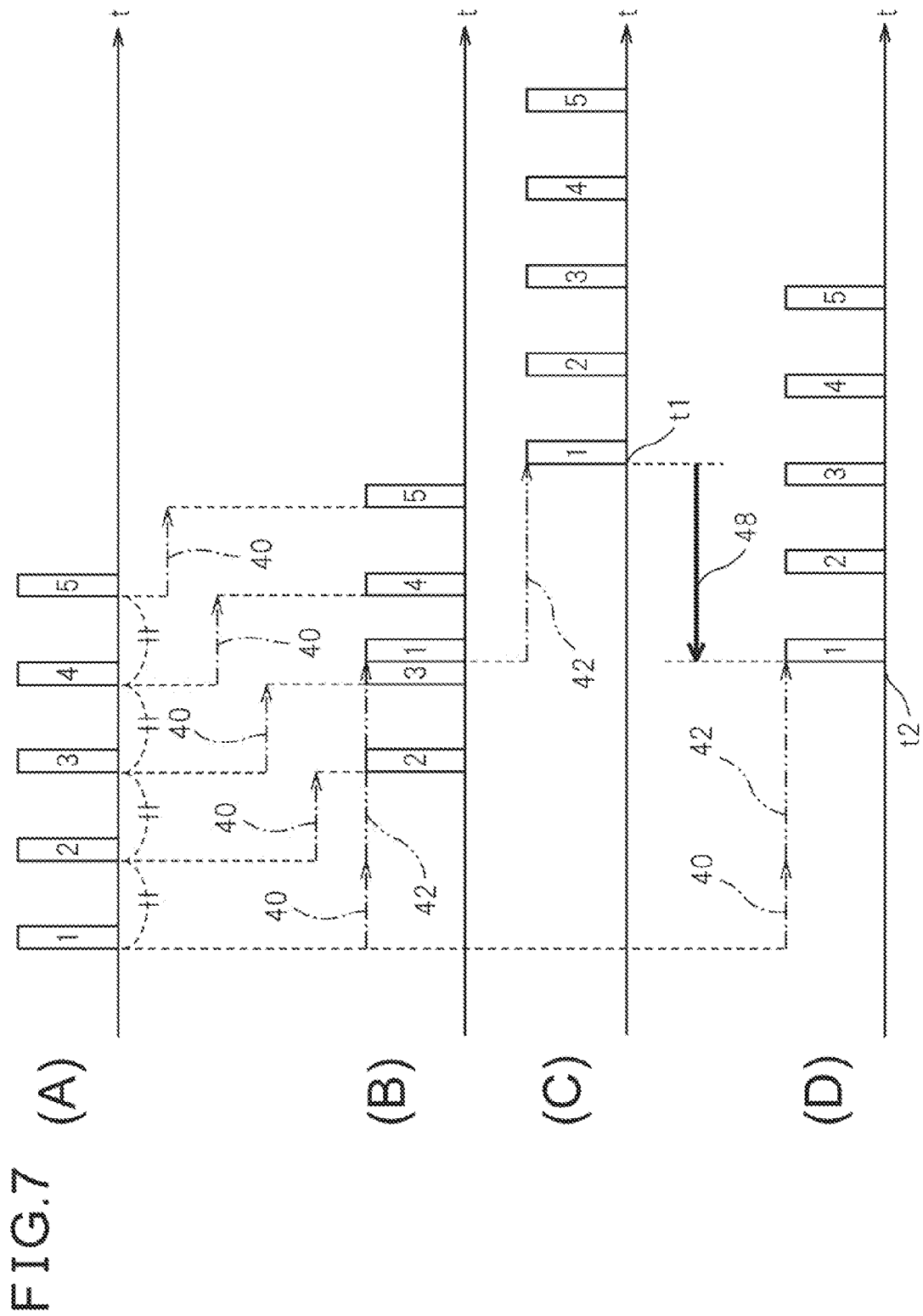
FIG. 7A is a diagram comparing buffer residence times.
FIG. 7B is a diagram comparing buffer residence times.
FIG. 7C is a diagram comparing buffer residence times.
FIG. 7D is a diagram comparing buffer residence times.

FIGS. 7A to 7D are diagrams illustrating how the residence time in the reorder buffer 33 differs between the reading method of the embodiment and the first reading method. FIG. 7A is a time chart depicting the segment data output from the switch interface 12, and FIG. 7B is a time chart depicting the segment data input to the switch interface 31.

FIG. 7C is a time chart depicting the segment data read out in accordance with the first reading method from the reorder buffer 33 that received the segment data of FIG. 7B, and input to the frame assembling unit 32.

FIG. 7D is a time chart depicting the segment data read out in accordance with the reading method of the embodiment from the reorder buffer 33 that received the segment data of FIG. 7B, and input to the frame assembling unit 32.

As depicted in FIG. 7B, a delay of (fixed delay time 40)+(maximum fluctuation 42) occurs in the starting segment. As a result, according to the first reading method, as depicted in FIG. 7C, the reading of the segment data begins at time t1 when a period equivalent to (fixed delay time 40)+2×(maximum fluctuation 42) has elapsed from the time at which the starting segment was transmitted to the switch 21.

On the other hand, according to the reading method of the embodiment, as depicted in FIG. 7D, the reading of the segment data begins at time t2 when a period equivalent to (fixed delay time 40)+(maximum fluctuation 42) has elapsed from the time at which the starting segment was transmitted to the switch 21. As a result, according to the reading method of the embodiment, compared with the first reading method, each segment data is read out earlier by a period 48 equivalent to the maximum fluctuation 42, and the residence time in the reorder buffer 33 is correspondingly reduced.

Figure 8:
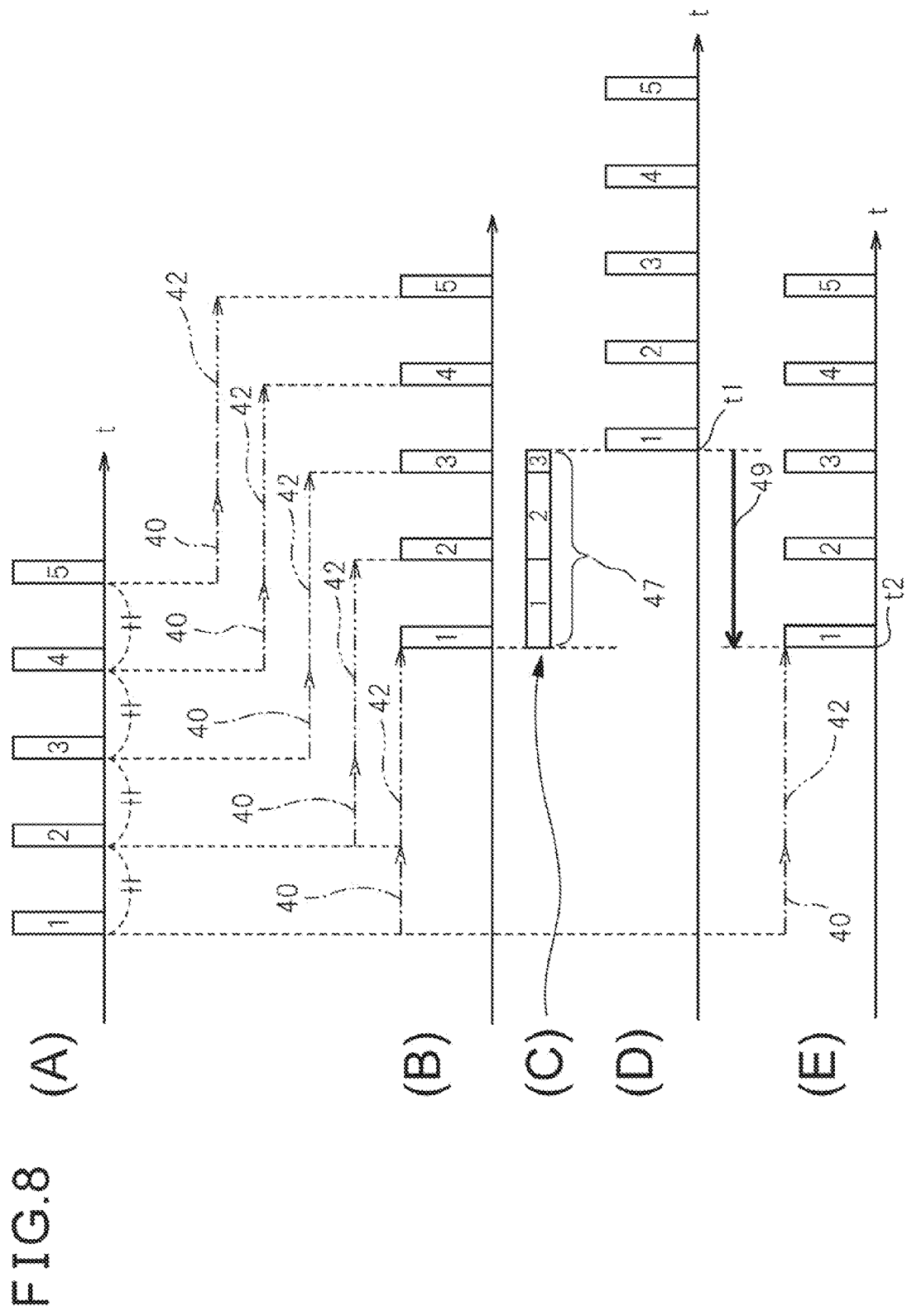
FIG. 8A is a diagram comparing buffer residence times.
FIG. 8B is a diagram comparing buffer residence times.
FIG. 8C is a diagram comparing buffer residence times.
FIG. 8D is a diagram comparing buffer residence times.
FIG. 8E is a diagram comparing buffer residence times.

FIGS. 8A to 8E are diagrams illustrating how the residence time in the reorder buffer 33 differs between the reading method of the embodiment and the second reading method. FIG. 8A is a time chart depicting the segment data output from the switch interface 12, and FIG. 8B is a time chart depicting the segment data input to the switch interface 31.

FIG. 8C illustrates the state of the reorder buffer 33 in which the segment data are stored. FIG. 8D is a time chart depicting the segment data read out in accordance with the second reading method from the reorder buffer 33 that received the segment data of FIG. 8B, and input to the frame assembling unit 32.

FIG. 8E is a time chart depicting the segment data read out in accordance with the reading method of the embodiment from the reorder buffer 33 that received the segment data of FIG. 8B, and input to the frame assembling unit 32.

As depicted in FIG. 8B, a delay of (fixed delay time 40)+(maximum fluctuation 42) occurs in any one of the first to fifth segment data. According to the second reading method, the reading of the segment data begins at time t1 after waiting until the amount of data stored in the reorder buffer 33 reaches the predetermined level 47 after the period equivalent to (fixed delay time 40)+(maximum fluctuation 42) has elapsed from the time at which the starting segment was transmitted to the switch 21.

On the other hand, according to the reading method of the embodiment, as depicted in FIG. 8E, the reading of the segment data begins at time t2 when the period equivalent to (fixed delay time 40)+(maximum fluctuation 42) has elapsed from the time at which the starting segment was transmitted to the switch 21. As a result, according to the reading method of the embodiment, each segment data is read out earlier by a period 49 which lasts until the amount of data stored in the reorder buffer 33 reaches the predetermined level 47, and the residence time in the reorder buffer 33 is correspondingly reduced.

Figure 9:
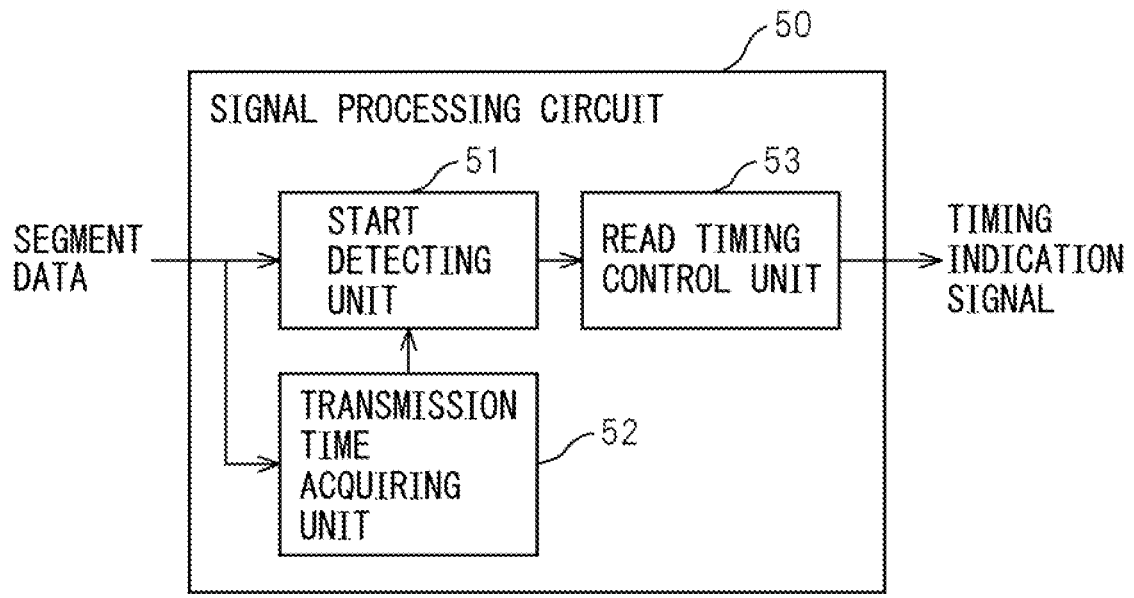
FIG. 9 is a diagram schematically illustrating the configuration of a first example of a signal processing circuit according to the embodiment disclosed herein.

A signal processing circuit for implementing the reading method of the embodiment will be described below. FIG. 9 is a diagram schematically illustrating the configuration of a first example of the signal processing circuit according to the present embodiment. Reference numeral 50 is the signal processing circuit, 51 is a start detecting unit, 52 is a transmission time acquiring unit, and 53 is a read timing control unit.

The signal processing circuit 50 thus includes the start detecting unit 51, the transmission time acquiring unit 52, and the read timing control unit 53. The signal processing circuit 50 may be, for example, a circuit that is included in the interface card 30 or the switching interface 31 and that controls processing for reading the segment data from the reorder buffer 33.

The start detecting unit 51 detects the starting segment from among the segment data that the switching interface 31 received from the switch 21. As earlier described, the starting segment refers to the first transmitted segment data to the switch 21 among the segment data received after the reorder buffer 33 has emptied.

For example, the switch interface 12 at the transmitting end may transmit each segment data by including in the header information thereof a serial number that indicates the transmission order of that segment data. For example, the start detecting unit 51 may detect the starting segment from among the received segment data by examining the serial number included in the header information.

Alternatively, the switch interface 12 at the transmitting end, for example, may transmit each segment data by including in the header information thereof transmission time information that indicates the time at which that segment data is transmitted to the switch 21. For example, the start detecting unit 51 may detect the starting segment from among the received segment data by examining the transmission time information included in the header information.

The transmission time acquiring unit 52 acquires the transmission timing of the segment data. The transmission time acquiring unit 52 may acquire the transmission timing of the segment data, for example, based on the transmission time information included in the header information appended to the segment data.

The read timing control unit 53 determines the timing for reading out the segment data from the reorder buffer 33, based on the transmission time that the transmission time acquiring unit 52 acquired for the starting segment. For example, the read timing control unit 53 determines that the read timing of the starting segment has arrived when a prescribed period has elapsed from the transmission time of the starting segment. After that, the read timing control unit 53 determines that the read timing of the subsequent segment data has arrived, each time that a predetermined period elapses, i.e., at a constant frequency. The read timing control unit 53 outputs a timing indication signal that indicates the read timing.

Figure 10:
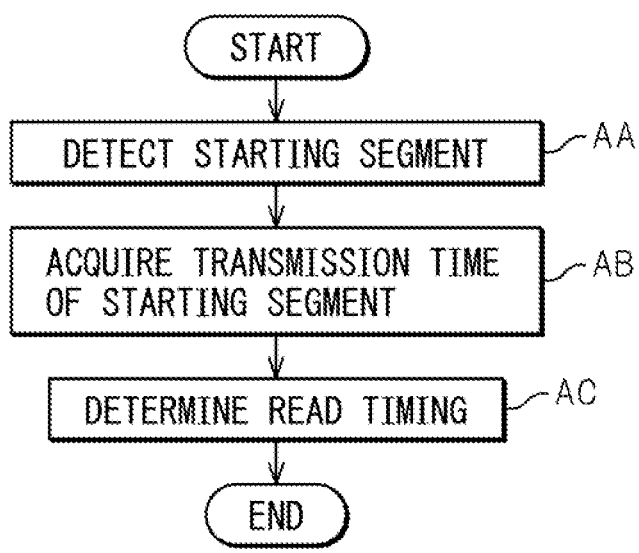
FIG. 10 is an explanatory diagram of the segment data reading method according to the embodiment disclosed herein.

FIG. 10 is an explanatory diagram illustrating the segment data readout process performed by the signal processing circuit 50 of FIG. 9. In an alternative embodiment, the following operations AA to AC may be implemented as steps.

In operation AA, the start detecting unit 51 detects the starting segment from among the segment data that the switching interface 31 received from the switch 21. In operation AB, the transmission time acquiring unit 52 acquires the transmission timing of the segment data. The order of operations AA and AB may be interchanged. For example, the start detecting unit 51 may detect the starting segment based on the transmission time that the transmission time acquiring unit 52 acquired for each segment data.

In operation AC, the read timing control unit 53 determines the timing for reading out the segment data from the reorder buffer 33, based on the transmission time that the transmission time acquiring unit 52 acquired for the starting segment. The read timing control unit 53 outputs a timing indication signal that indicates the read timing.

According to the present embodiment, the timing for reading out the segment data stored in the reorder buffer 33 is determined based on the transmission time of the starting segment. The read timing can thus be determined without being affected by the delay fluctuation of the segment data. Since this serves to prevent the occurrence of a situation in which the residence time in the reorder buffer 33 increases according to the amount of the delay fluctuation of the segment data, the residence time in the reorder buffer 33 can be reduced.

In an alternative method for determining the segment data read timing based on the transmission time of the segment data, the read timing of each segment data may be determined based on the transmission time of that segment data. However, this method increases the amount of processing in the signal processing circuit 50, since there is a need to compare the transmission time and the current time for each segment data stored in the reorder buffer 33.

On the other hand, according to the above embodiment, the read timing control unit 53 determines that the read timing of the starting segment has arrived, for example, based on the transmission time of the starting segment; after that, the read timing control unit 53 determines that the read timing of the subsequent segment data has arrived, each time that a predetermined period elapses. According to this determining method, since the signal processing circuit 50 need not compare the transmission time and the current time once the starting segment has been detected, the amount of processing in the signal processing circuit 50 can be reduced.

Figure 11:
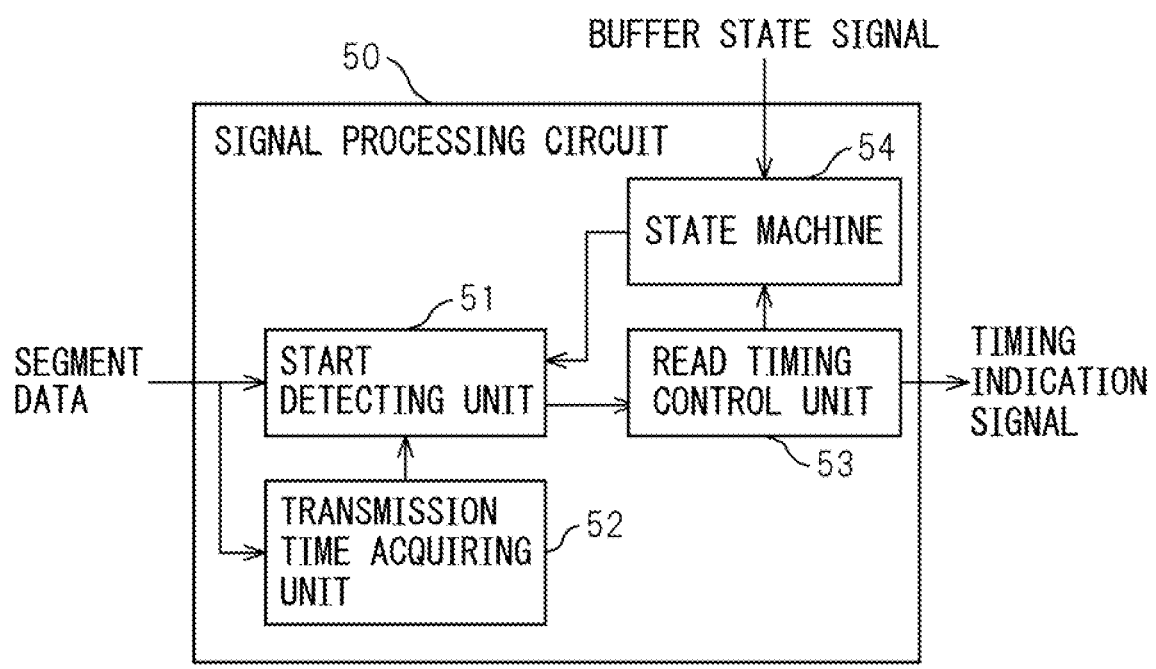
FIG. 11 is a diagram schematically illustrating the configuration of a second example of the signal processing circuit according to the embodiment disclosed herein.

FIG. 11 is a diagram schematically illustrating the configuration of a second example of the signal processing circuit according to the present embodiment. The same component elements as those in FIG. 9 are designated by the same reference numerals as those used in FIG. 9, and the same functions will not be further described here.

The signal processing circuit 50 includes a state machine 54 which makes a transition between first and second states. The state machine 54 receives a buffer state signal indicating the segment data storage state of the reorder buffer 33, and transitions from the first state to the second state when the reorder buffer 33 has emptied. The state machine 54 transitions from the second state to the first state when the timing for reading out the starting segment from the reorder buffer 33 has arrived.

That is, the first state is the state in which the reading of the starting segment is initiated and the reading of the subsequent segment data continues until the reorder buffer 33 becomes empty. The second state is the state in which the reorder buffer 33 is empty and the starting segment is not yet detected, so the reading of the starting segment is not yet initiated.

During the period when the state machine 54 is in the second state, the start detecting unit 51 performs processing to detect the starting segment from among the segment data received from the switch 21.

Figure 12:
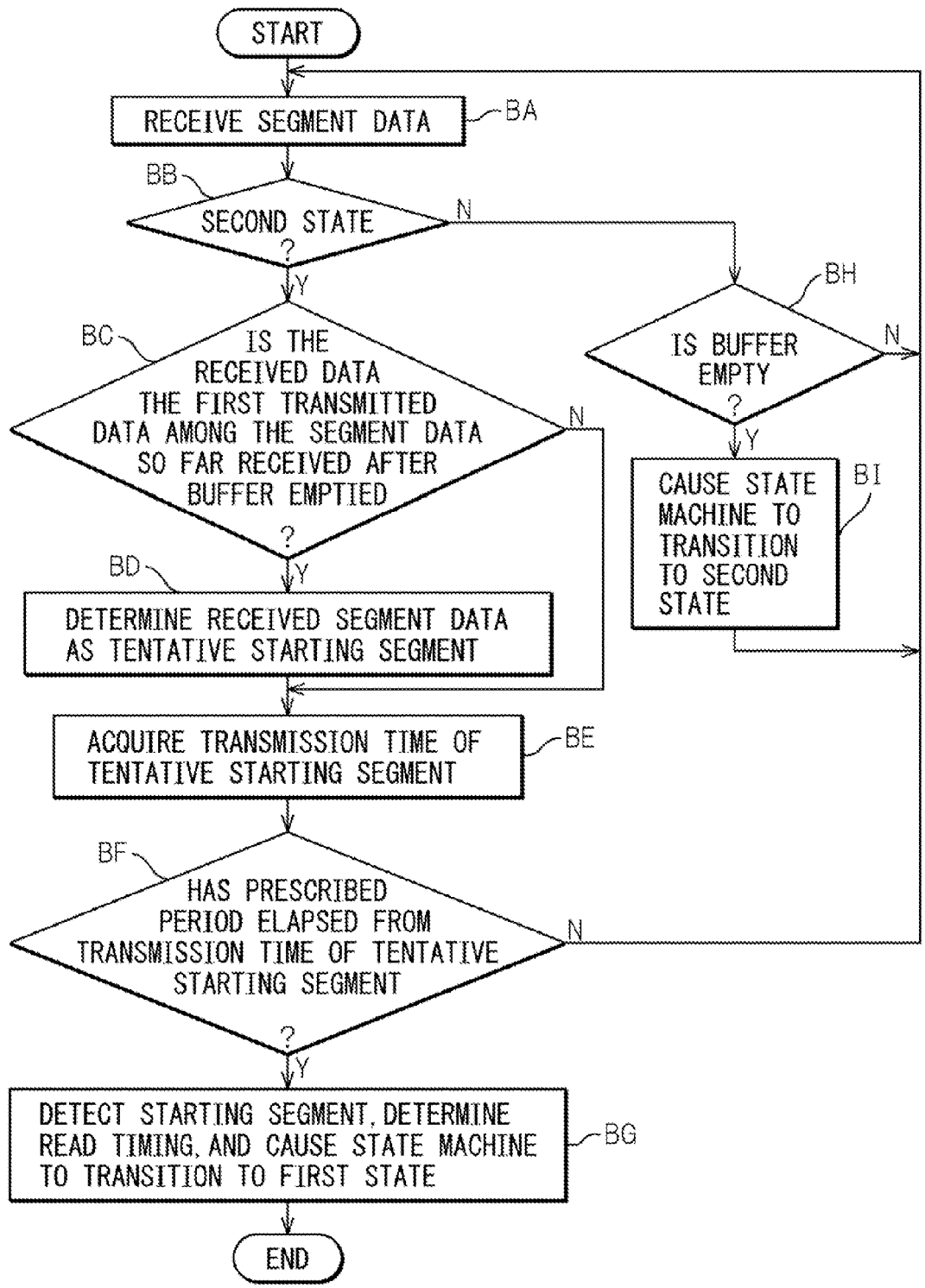
FIG. 12 is an explanatory diagram of the segment data reading method according to the embodiment disclosed herein.

FIG. 12 is an explanatory diagram illustrating the segment data readout process performed by the signal processing circuit 50 of FIG. 11. In an alternative embodiment, the following operations BA to BI may be implemented as steps.

In operation BA, the switch interface 31 receives the segment data transmitted from the switch interface 12 via the switch 21. In operation BB, the start detecting unit 51 checks whether the state machine 54 is in the second state. If the state machine 54 is in the second state (Y in operation BB), the process proceeds to operation BC. If the state machine 54 is not in the second state (N in operation BB), the process proceeds to operation BH.

In operation BC, the start detecting unit 51 checks whether the segment data received in operation BA is the first transmitted segment data from the switch interface 12 among the segment data so far received after the reorder buffer 33 emptied. The start detecting unit 51 may carry out the operation BC by examining the serial number included in the header information of the segment data. Alternatively, the start detecting unit 51 may carry out the operation BC by examining the transmission time information included in the header information of the segment data.

If the received segment data is the first transmitted data (Y in operation BC), then in operation BD the start detecting unit 51 tentatively determines that the segment data received in operation BA is the starting segment. Thereafter, the process proceeds to operation BE.

If the received segment data is not the first transmitted data (N in operation BC), the start detecting unit 51 skips operation BD and proceeds directly to operation BE. That is, the start detecting unit 51 takes as the tentative starting segment the starting segment tentatively determined in operation BD performed during the period leading up to the current moment after the reorder buffer 33 emptied.

In operation BE, the transmission time acquiring unit 52 acquires the transmission time at which the switch interface 12 at the transmitting end transmitted the tentative starting segment to the switch 21. The transmission time acquiring unit 52 may acquire the transmission times of all the received segment data. In this case, operation BE may be performed before operation BC or BD.

In operation BF, the start detecting unit 51 checks whether a prescribed period T has elapsed from the transmission time of the tentative starting segment. If the prescribed period T has elapsed from the transmission time of the tentative starting segment (Y in operation BF), the process proceeds to operation BG. If the prescribed period T has not yet elapsed from the transmission time of the tentative starting segment (N in operation BF), the process returns to operation BA.

In operation BG, the start detecting unit 51 detects the tentative starting segment as being the starting segment. When the starting segment is detected by the start detecting unit 51, the read timing control unit 53 determines that the timing to start reading the segment data from the reorder buffer 33 has arrived. The read timing control unit 53 outputs a timing indication signal that indicates the read timing. Further, the state machine 54 transitions from the second state to the first state. After that, the process is terminated.

In operation BH, the state machine 54 checks the buffer state signal to see whether the reorder buffer 33 is empty or not. If the reorder buffer 33 is empty (Y in operation BH), the state machine 54 transitions from the first state to the second state in operation BI. Thereafter, the process returns to operation BA. If the reorder buffer 33 is not empty (N in operation BH), the process returns to operation BA.

When the reorder buffer 33 is empty, the signal processing circuit 50 of the present embodiment initiates the process of determining the timing to start reading from the reorder buffer 33 the segment data the reception of which begins thereafter. In this process, the signal processing circuit 50 detects the starting segment, and determines the readout start timing of the segment data based on the transmission time of the starting segment.

According to the present embodiment, the signal processing circuit 50 can store, using the state machine 54, the state in which the reorder buffer 33 is empty and the starting segment is not yet detected. Therefore, by referring to the state of the state machine 54, the signal processing circuit 50 can determine whether or not to start the process for detecting the starting segment.

Figure 13:
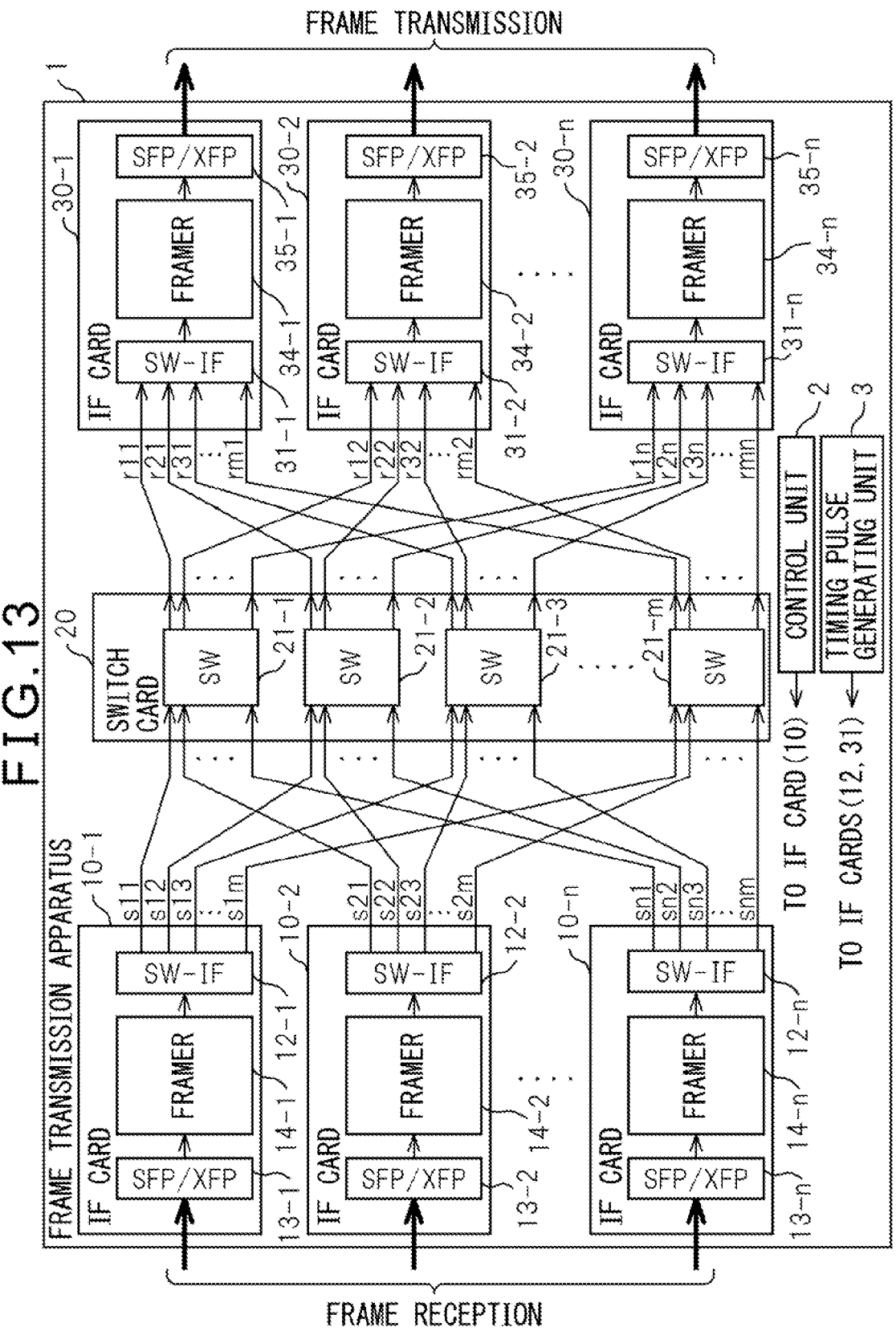
FIG. 13 is a diagram schematically illustrating the configuration of a second example of the frame transmission apparatus equipped with a plurality of switches.

FIG. 13 is a diagram schematically illustrating the configuration of a second example of the frame transmission apparatus equipped with a plurality of switches. The same component elements as those in FIG. 2 are designated by the same reference numerals as those used in FIG. 2, and the same functions will not be further described here. The frame transmission apparatus 1 in the illustrated example is a frame transmission apparatus that performs switching of OTN frames transmitted over an optical transport network. It will, however, be noted that the switching interfaces 12 and 31 according to the embodiment hereinafter described can be applied not only to frame transmission apparatus that perform switching of OTN frames, but also to frame transmission apparatus that perform switching of frames transmitted using other transmission schemes.

Reference numerals 13-1 to 13-$n$ are optical receiver modules (SFP/XFP) (hereinafter sometimes collectively referred to as the optical receiver module 13), and 14-1 to 14-$n$ are framers (hereinafter sometimes collectively referred to as the framer 14). Reference numerals 34-1 to 34-$n$ are framers (hereinafter sometimes collectively referred to as the framer 34), and 35-1 to 35-$n$ are optical transmitter modules (SFP/XFP) (hereinafter sometimes collectively referred to as the optical transmitter module 35). Reference numeral 3 is a timing pulse generating unit.

The interface cards 10-1 to 10-$n$ include the respective optical receiver modules 13-1 to 13-$n$, the respective framers 14-1 to 14-$n$, and the respective switch interfaces 12-1 to 12-$n$. Similarly, the interface cards 30-1 to 30-$n$ include the respective switch interfaces 31-1 to 31-$n$, the respective framers 34-1 to 34-$n$, and the respective optical transmitter modules 35-1 to 35-$n$.

The interface cards 10-$i$ and 30-$i$ ($i$ is a suffix, the value being 1, 2, . . . , n) may be combined into a single card. In this case, the switch interfaces 12-$i$ and 31-$i$ may be mounted on the same unit. For example, the switch interfaces 12-$i$ and 31-$i$ may be mounted on the same circuit chip.

The optical receiver module 13 performs processing to receive OTN frames transmitted over an optical transport network. The framer 14 demaps OTN frames from the signal received by the optical receiver module 13, and divides each OTN frame into a plurality of segment data. The framer 14 supplies the plurality of segment data to the switch interface 12.

The framer 34 receives the segment data output from the switch interface 31, and assembles the segment data into an OTN frame. The optical transmitter module 35 transmits the OTN frame assembled by the framer 34 onto an optical transport network. The timing pulse generating unit 3 generates a timing pulse signal producing pulses at predetermined intervals of time, and supplies it to the switch interfaces 12 and 31.

The interface card 10 and the switch interface 12, both located on the segment data input side of the switch 21, may hereinafter be referred to as the ingress interface card and the ingress switch interface, respectively. The interface card 30 and the switch interface 31, both located on the segment data output side of the switch 21, may hereinafter be referred to as the egress interface card and the egress switch interface, respectively.

Figure 14:
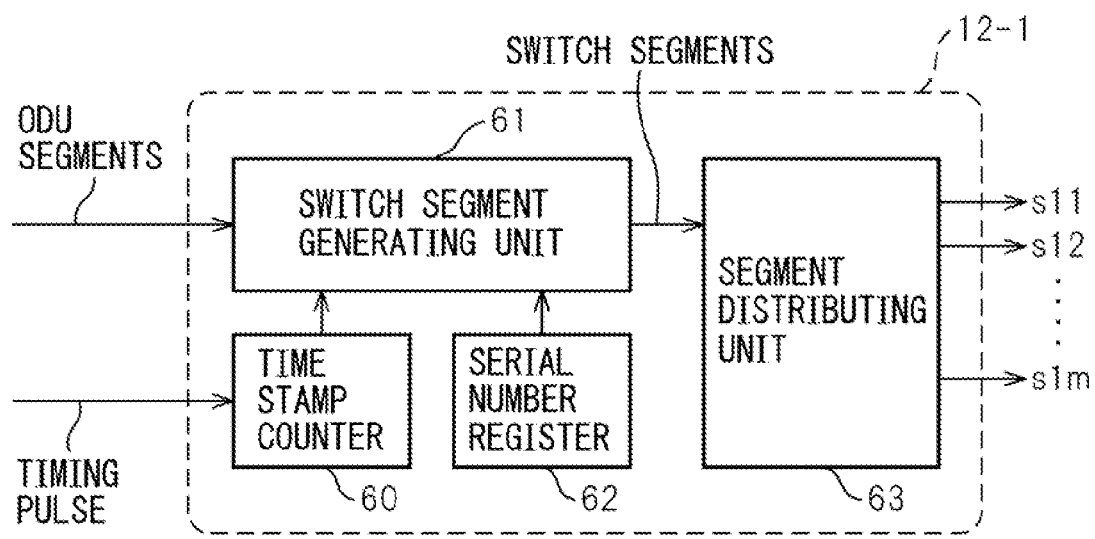
FIG. 14 is a diagram schematically illustrating the configuration of an ingress switch interface.

FIG. 14 is a diagram schematically illustrating the configuration of the ingress switch interface 12-1. The configuration is the same for the other switch interfaces 12-2 to 12-n. Reference numeral 60 is a time stamp counter, 61 is a switch segment generating unit, 62 is a serial number register, and 63 is a segment distributing unit.

The switch interface 12-1 thus includes the time stamp counter 60, the serial number register 62, the switch segment generating unit 61, and the segment distributing unit 63.

The time stamp counter 60 receives the timing pulse signal from the timing pulse generating unit 3, and performs counting with the received timing as the initial value. Since the timing pulse signal produces pulses at predetermined intervals of time, the count value can be used as timing indication information. The count value of the counter initialized by a pulse contained in the timing pulse signal supplied from the timing pulse generating unit 3 may hereinafter be referred to as the "time stamp."

The switch segment generating unit 61 receives ODU segments, i.e., the segment data that the framer 14 generated by dividing the OTN frame. The switch segment generating unit 61 generates a switch segment by appending prescribed header information to each ODU segment, and supplies it to the segment distributing unit 63.

The header information carries, for example, the identifier of the switch interface 12-1 as the source of the segment data and the identifier of the destination interface card 30 that is determined according to the destination of the original ODU frame. The switch segment generating unit 61 may determine the destination interface card 30 based on the setting information predefined by the control unit 2.

The switch segment generating unit 61 includes in the header information the time stamp output from the time stamp counter 60. Further, the switch segment generating unit 61 includes in the header information the serial number assigned to each ODU segment.

The serial number register 62 manages the serial number to be assigned to each ODU segment. If the ODU segments received by the switch interface 12-1 are signals flowing on a plurality of different channels, the switch interface 12-1 may include the serial number register 62 for each channel. Then, the serial number can be managed for each channel. The segment distributing unit 63 distributes the switch segments received from the switch segment generating unit 61 to the plurality of switches 21-1 to 21-n.

Figure 15:
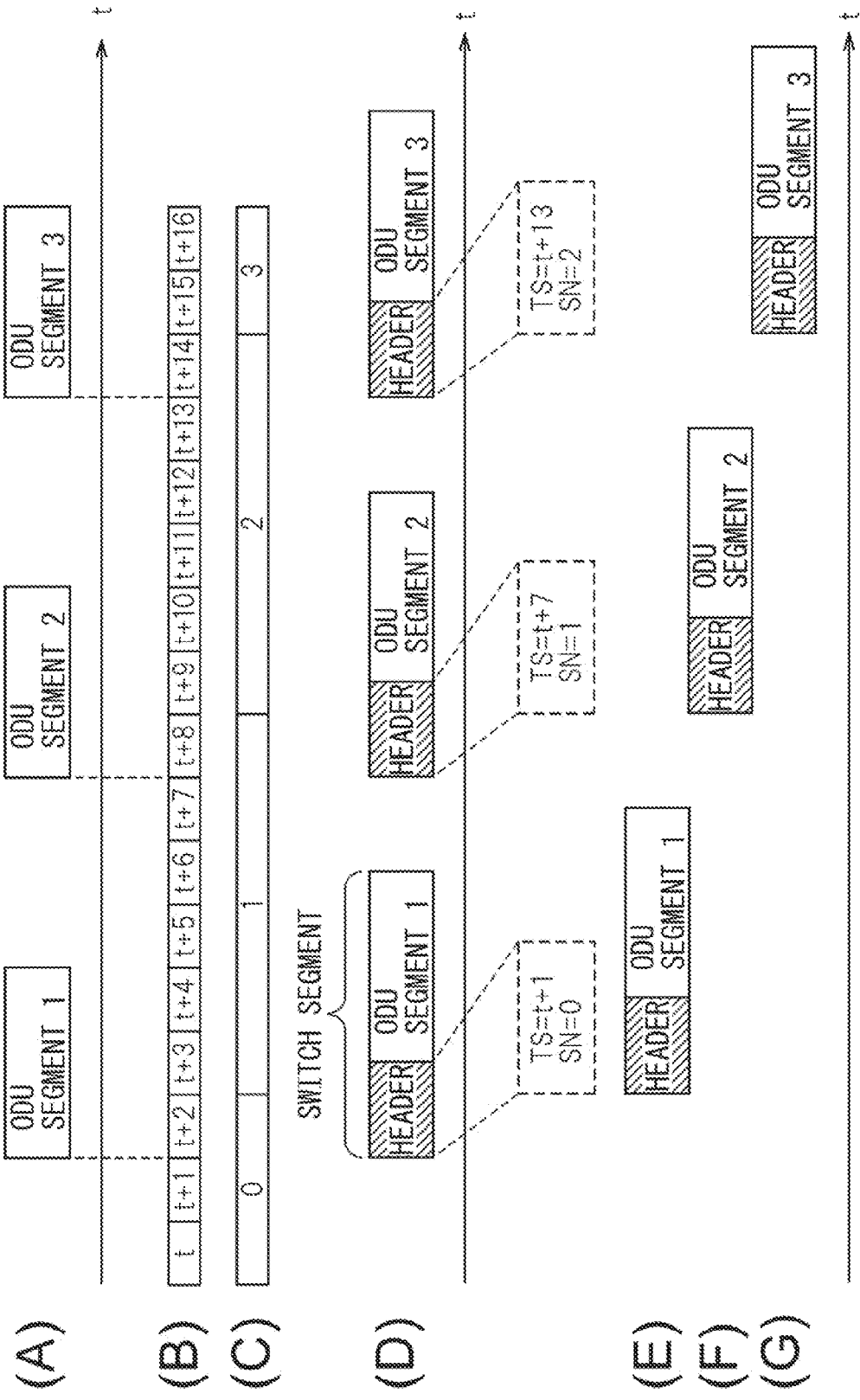
FIG. 15A is an explanatory diagram illustrating how the segment data are processed in the ingress switch interface.
FIG. 15B is an explanatory diagram illustrating how the segment data are processed in the ingress switch interface.
FIG. 15C is an explanatory diagram illustrating how the segment data are processed in the ingress switch interface.
FIG. 15D is an explanatory diagram illustrating how the segment data are processed in the ingress switch interface.
FIG. 15E is an explanatory diagram illustrating how the segment data are processed in the ingress switch interface.
FIG. 15F is an explanatory diagram illustrating how the segment data are processed in the ingress switch interface.
FIG. 15G is an explanatory diagram illustrating how the segment data are processed in the ingress switch interface.

FIGS. 15A to 15G are explanatory diagrams illustrating how the segment data are processed in the ingress switch interface 12-1. FIG. 15A is a time chart depicting the ODU segments input to the switch segment generating unit 61, and FIG. 15B is a time chart depicting the time stamp output from the time stamp counter 60.

FIG. 15C is a time chart depicting the serial number held in the serial number register 62, and FIG. 15D is a time chart depicting the switch segments output from the switch segment generating unit 61. FIGS. 15E to 15G are time charts depicting the switch segments output on the lanes s11 to s13, respectively. In FIG. 15D, "TS" represents the time stamp, and "SN" the serial number.

The value of the time stamp output from the time stamp counter 60 is incremented by one for every predetermined period of time. In the time chart of FIG. 15B, the value of the time stamp increases incrementally from "t" up to "t+16". As depicted in FIG. 15A, the switch segment generating unit 61 receives three ODU frames when the value of the time stamp is "t+1", "t+7", and "t+13", respectively.

For the ODU frame received when the value of the time stamp is "t+1", the switch segment generating unit 61 generates a switch segment by appending to the ODU frame the header information carrying the time stamp "t+1" and serial number "0" output at that time. This is illustrated in FIG. 15D. After that, the switch segment generating unit 61 increments by one the value of the serial number held in the serial number register 62. As a result, the value of the serial number increases from "0" to "1".

For the ODU frame received when the value of the time stamp is "t+7", the switch segment generating unit 61 appends to the ODU frame the header information carrying the time stamp "t+7" and serial number "1" output at that time. After that, the switch segment generating unit 61 increments by one the value of the serial number held in the serial number register 62. As a result, the value of the serial number increases from "1" to "2".

For the ODU frame received when the value of the time stamp is "t+13", the switch segment generating unit 61 appends to the ODU frame the header information carrying the time stamp "t+13" and serial number "2" output at that time. After that, the switch segment generating unit 61 increments by one the value of the serial number held in the serial number register 62. As a result, the value of the serial number increases from "2" to "3".

As depicted in FIGS. 15E to 15G, the segment distributing unit 63 distributes the switch segments of serial numbers "0", "1", and "2" to the respective lanes s11 to s13.

Figure 16:
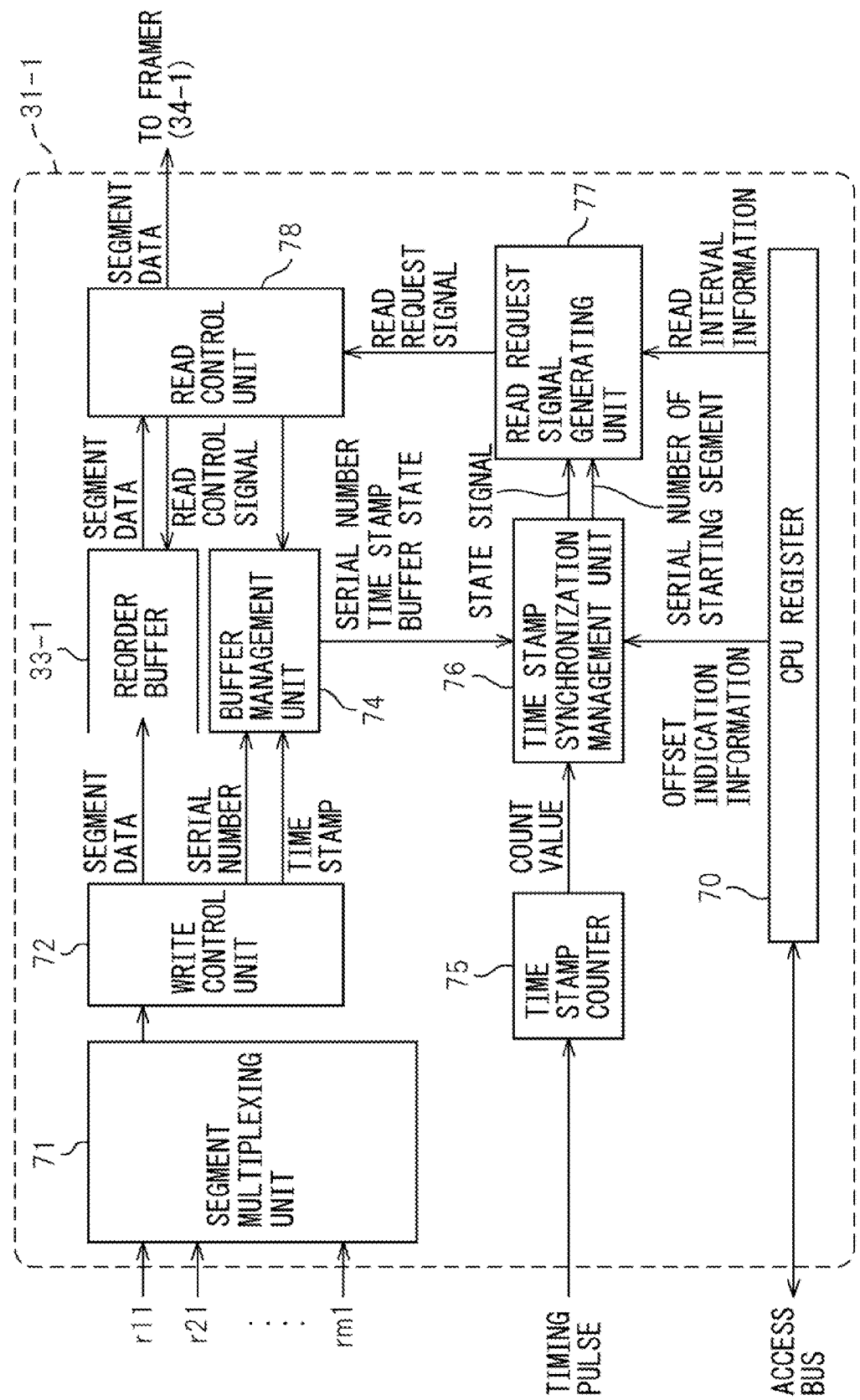
FIG. 16 is a diagram schematically illustrating the configuration of a first example of an egress switch interface.

FIG. 16 is a diagram schematically illustrating the configuration of a first example of the egress switch interface 31-1. The configuration is the same for the other switch interfaces 31-2 to 31-n. Reference numeral 70 is a CPU register, 71 is a segment multiplexing unit, 72 is a write control unit, 74 is a buffer management unit, and 75 is a time stamp counter. Reference 76 is a time stamp synchronization management unit, 77 is a read request signal generating unit, 78 is a read control unit, and 33-1 is a reorder buffer.

The switch interface 31-1 thus includes the CPU register 70, the segment multiplexing unit 71, the write control unit 72, the buffer management unit 74, and the time stamp counter 75. The switch interface 31-1 further includes the time stamp synchronization management unit 76, the read request signal generating unit 77, the read control unit 78, and the reorder buffer 33-1.

The segment multiplexing unit 71 multiplexes the switch segments received from the plurality of switches 21-1 to 21-m via the plurality of lanes r11 to rm1, and supplies the thus multiplexed data to the write control unit 72. FIGS. 17A to 17D are explanatory diagrams illustrating the process performed by the segment multiplexing unit 71.

Figure 17:
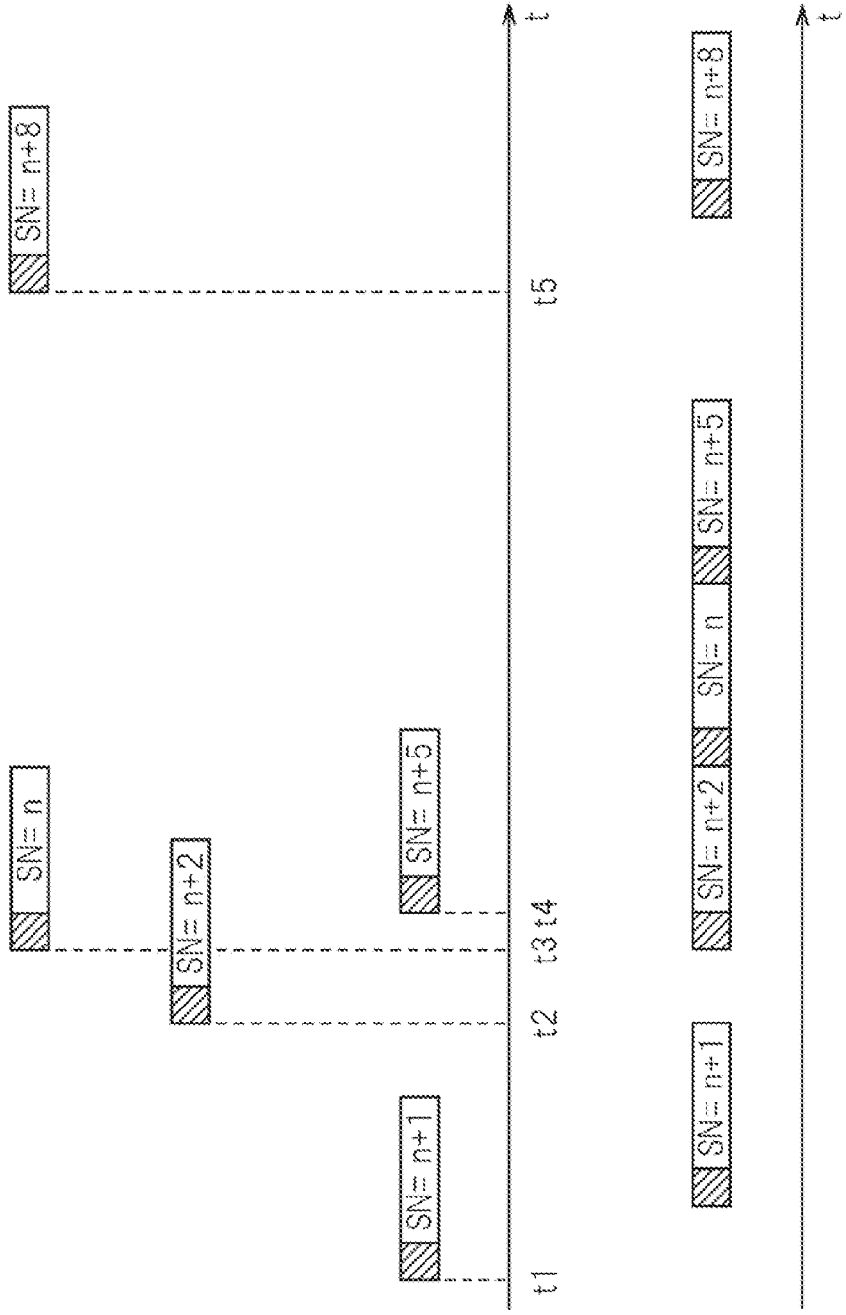
FIG. 17A is an explanatory diagram illustrating the process performed by a segment multiplexing unit.
FIG. 17B is an explanatory diagram illustrating the process performed by a segment multiplexing unit.
FIG. 17C is an explanatory diagram illustrating the process performed by a segment multiplexing unit.
FIG. 17D is an explanatory diagram illustrating the process performed by a segment multiplexing unit.

FIGS. 17A, 17B, and 17C are time charts depicting the switch segments that the segment multiplexing unit 71 receives via the lanes r11, r21, and rm1, respectively. FIG. 17D is a time chart depicting the switch segments multiplexed by the segment multiplexing unit 71. In FIGS. 17A to 17D, "SN" represents the serial number.

As depicted in FIGS. 17A to 17C, the switch segment of serial number "n+1" is received at time t1 via the lane rm1, and after that, the switch segment of serial number "n+2" is received at time t2 via the lane r21. Then, the switch segment of serial number "n" is received at time t3 via the lane r11, and after that, the switch segment of serial number "n+5" is received at time t4 via the lane rm1. Thereafter, the switch segment of serial number "n+8" is received at time t5 via the lane r11.

In this way, the switch segments may not arrive at the segment multiplexing unit 71 in the same order as the serial numbers of the switch segments due to the delay fluctuations they experience when passing through the switch 21. As a result, as depicted in FIG. 7D, the multiplexed switch segments may not necessarily be output from the segment multiplexing unit 71 by being arranged in the same order as the serial numbers.

Reference is made to FIG. 16. The write control unit 72 terminates the switch segments output from the segment multiplexing unit 71, and stores the ODU segments (hereinafter simply referred to as the "segment data") in the reorder buffer 33-1.

Figure 18:
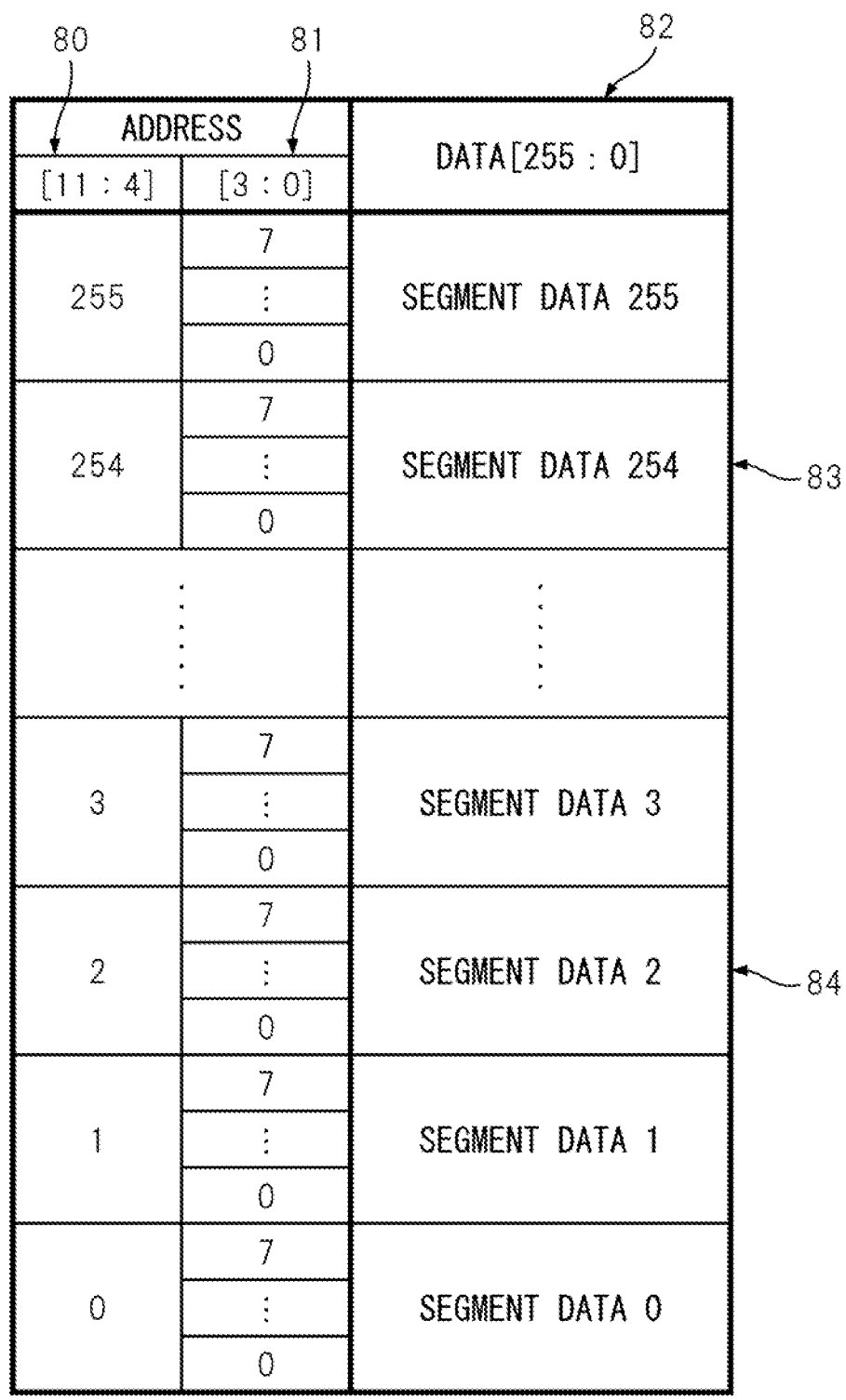
FIG. 18 is an explanatory diagram illustrating an implementation of a reorder buffer.

FIG. 18 is an explanatory diagram illustrating an implementation of the reorder buffer 33-1. In the illustrated example, the bit width of the serial number included in the header information is 14 bits, and the input data width to the reorder buffer 33-1, i.e., the number of bits that can be stored in one address, is 256 bits. Further, the segment data size is 256 bytes, the maximum fluctuation expected to occur is 128 segments, and the maximum number of segments that can be stored is 256.

The column represented by reference numeral 80 indicates the value of the fourth to 11th low-order bits of the memory address in the reorder buffer 33-1, and the column represented by reference numeral 81 indicates the value of the low-order four bits of the memory address in the reorder buffer 33-1.

For example, reference numeral 83 indicates a storage area of 256 bits×8=256 bytes, where the value of the fourth to 11th low-order bits is "254" and the value of the low-order four bits is "0" to "7". Similarly, reference numeral 84 indicates a storage area of 256 bytes, where the value of the fourth to 11th low-order bits is "2" and the value of the low-order four bits is "0" to "7".

The write control unit 72 examines the serial number included in the header information of each segment data, and uses the low-order eight bits of the serial number as the fourth to 11th low-order bits of the address for storing the segment data. The write control unit 72 stores the segment data of 256 bytes in eight 256-bit storage areas by sequentially incrementing the low-order four bits of the address from "0" up to "7".

Reference is made to FIG. 16. The write control unit 72 acquires, from the header information of each segment data, the serial number of the segment data and the time stamp appended to it at the time of transmission from the switch interface 12. The write control unit 72 supplies the serial number and time stamp to the buffer management unit 74. The write control unit 72 here is given as one example of the transmission time acquiring unit described in the appended claims.

By receiving the serial number and time stamp from the write control unit 72, the buffer management unit 74 detects an increase in the amount of segment data stored in the reorder buffer 33-1. Further, by receiving from the read control unit 78 a notification signal notifying that segment data has been read out of the reorder buffer 33-1, the buffer management unit 74 detects a decrease in the amount of segment data stored in the reorder buffer 33-1. By thus detecting an increase and a decrease in the amount of segment data stored in the reorder buffer 33-1, the buffer management unit 74 monitors the amount of segment data accumulated in the reorder buffer 33-1.

The buffer management unit 74 supplies to the time stamp synchronization management unit 76 the serial number and time stamp received from the write control unit 72 and a buffer state signal indicating the amount of segment data accumulated in the reorder buffer 33-1.

The time stamp counter 75 receives the timing pulse signal from the timing pulse generating unit 3, and counts the received timing as the initial value. Therefore, the initial value of the count value that the time stamp counter 75 outputs matches the initial value of the count value that the time stamp counter 60 provided in the ingress switch interface 12 outputs. As a result, the count value of the time stamp counter 75 and the count value of the time stamp counter 60 indicate the time stamp of the same value. The time stamp counter 75 supplies the count value to the time stamp synchronization management unit 76. The count value of the timing pulse signal counted by the time stamp counter 75 may hereinafter be simply referred to as the "count value."

The time stamp synchronization management unit 76 receives the serial number and time stamp of the received segment data and the buffer state signal from the buffer management unit 74, and receives the count value from the time stamp counter 75. Further, the time stamp synchronization management unit 76 reads offset indication information (to be described later) from the CPU register 70. Based on the serial number, time stamp, buffer state signal, count value, and offset indication information, the time stamp synchronization management unit 76 outputs a state signal indicating one of two states, "RO state" or "TS state."

The "RO state" is the state in which the reading of the starting segment is initiated and the reading of the subsequent segment data continues until the reorder buffer 33-1 becomes empty. The "TS state" is the state in which the reorder buffer 33-1 is empty and the starting segment is not yet detected, so the reading of the starting segment is not yet initiated.

As will be described later, the time stamp synchronization management unit 76 includes a state machine which stores a state that makes a transition between the "RO state" and the "TS state." The "RO state" and the "TS state" are respectively given as examples of the "first state" and the "second state" described in the appended claims. The time stamp synchronization management unit 76 supplies the state signal to the read request signal generating unit 77.

When the state machine is in the "TS state," the time stamp synchronization management unit 76 performs processing to detect the starting segment. When the starting segment is detected, the time stamp synchronization management unit 76 supplies the serial number of the starting segment to the read request signal generating unit 77. The time stamp synchronization management unit 76 here is given as one example of the start detecting unit and read timing control unit described in the appended claims. The process performed by the time stamp synchronization management unit 76 will be described in detail later.

The read request signal generating unit 77 reads read interval information from the CPU register 70. When the value indicated by the state signal changes from the "TS state" to the "RO state," the read request signal generating unit 77 generates a read request signal for reading out the starting segment from the reorder buffer 33-1. Further, the read request signal generating unit 77 generates, at time intervals indicated by the read interval information, a read request signal for reading out the segment data succeeding the starting segment. The read request signal generating unit 77 supplies the read request signal to the read control unit 78.

The read control unit 78 reads out the segment data from the reorder buffer 33-1 by outputting a read control signal in response to the read request signal received from the read request signal generating unit 77. The read control unit 78 supplies the readout segment data to the framer 34-1 at predetermined intervals of time.

The CPU register 70 holds set values such as the offset indication information and read interval information. The CPU register 70 is connected to an access bus accessible from a prescribed processor provided on the interface card 30-1, and the above set values can be changed by the processor.

Figure 19:
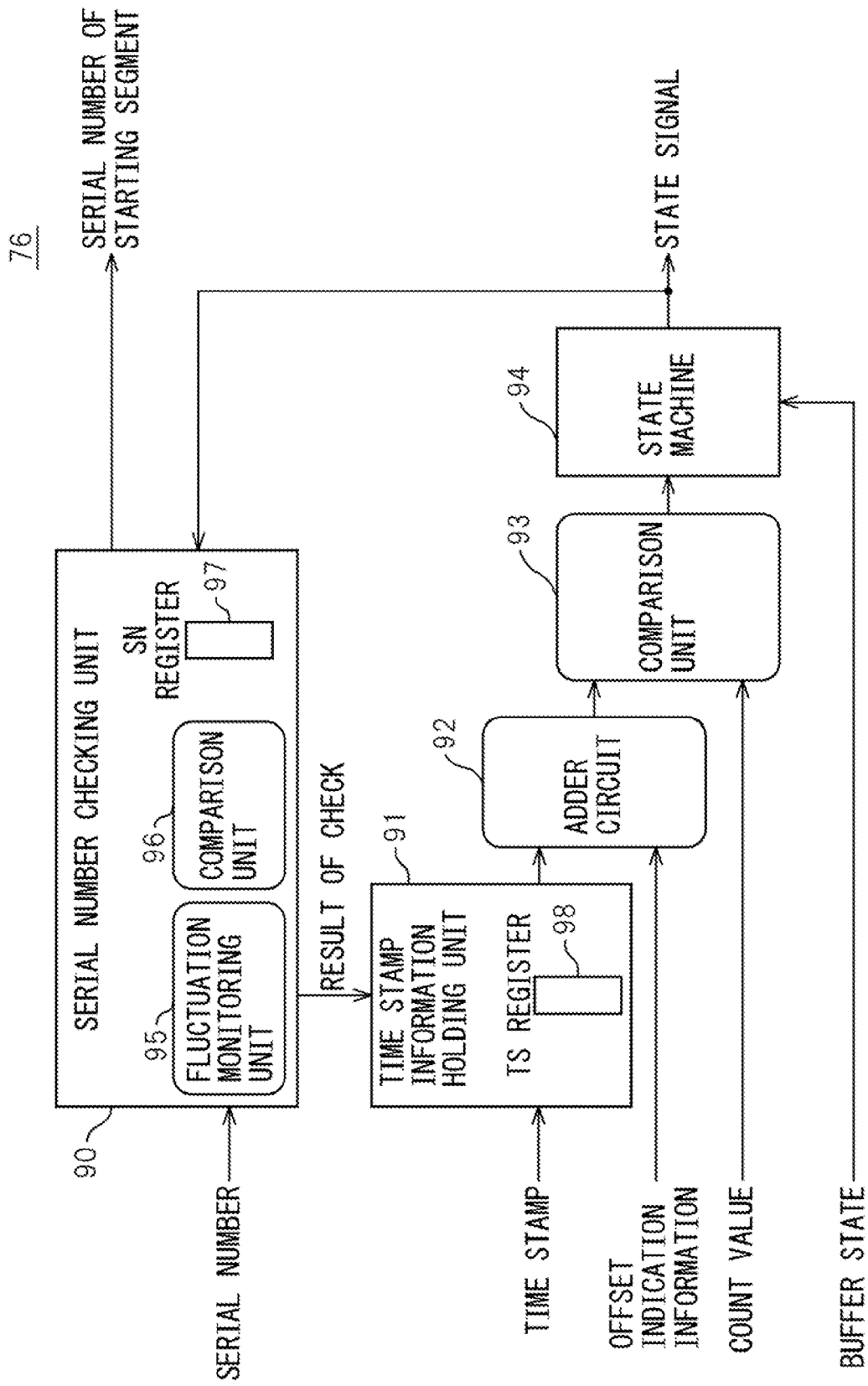
FIG. 19 is a diagram schematically illustrating the configuration of a time stamp synchronization management unit.

FIG. 19 is a diagram schematically illustrating the configuration of the time stamp synchronization management unit 76. Reference numeral 90 is a serial number checking unit, 91 is a time stamp information holding unit, 92 is an adder circuit, and 93 is a comparison unit. Reference numeral 94 is the state machine, 95 is a fluctuation monitoring unit, 96 is a comparison unit, 97 is a serial number register, and 98 is a time stamp register. In FIG. 19, "TS" represents the time stamp, and "SN" the serial number.

The time stamp synchronization management unit 76 thus includes the serial number checking unit 90, the time stamp information holding unit 91, the adder circuit 92, the comparison unit 93, and the state machine 94. The state machine 94 stores a state that makes a transition between the "RO state" and the "TS state." When the state machine 94 is in the "TS state," the serial number checking unit 90 receives the serial number of the received segment data from the buffer management unit 74.

The serial number checking unit 90 includes the fluctuation monitoring unit 95, the comparison unit 96, and the serial number register 97. The fluctuation monitoring unit 95 checks whether the difference between the received serial number and the value of the serial number register 97 lies within an allowable fluctuation range.

When the difference between the received serial number and the value of the serial number register 97 lies within the allowable fluctuation range, the comparison unit 96 compares the received serial number with the serial number stored in the serial number register 97.

If the received serial number is smaller than the serial number stored in the serial number register 97, the comparison unit 96 stores the received serial number in the serial number register 97. That is, if the order indicated by the received serial number is higher than that indicated by the serial number stored in the serial number register 97, the comparison unit 96 stores the received serial number in the serial number register 97.

However, if the serial number is received for the first time after the switch interface 30-1 has been turned on or after the state machine 94 has made a transition to the "TS state," this serial number is stored in the serial number register 97. Accordingly, among the segment data so far received after the reorder buffer 33-1 emptied, the serial number of the first transmitted segment data from the switch interface 12 is stored in the serial number register 97. In the description given herein, the segment data whose serial number is stored in the serial number register 97 may be referred to as the "tentative starting segment."

The serial number checking unit 90 supplies the serial number of the tentative starting segment, stored in the serial number register 97, to the read request signal generating unit 77.

The result of the comparison from the comparison unit 96 is supplied to the time stamp information holding unit 91. The time stamp information holding unit 91 receives the time stamp output from the buffer management unit 74. The time stamp information holding unit 91 includes a time stamp register 98 for storing the time stamp.

When the value of the serial number register 97 is updated, the time stamp information holding unit 91 updates the value of the time stamp register 98 by the time stamp of the segment data having the updated serial number. As a result, the time stamp of the tentative starting segment is stored in the time stamp register 98.

In the adder circuit 92, the value of the offset indication information read out of the CPU register 70 is added to the time stamp stored in the time stamp register 98. Thus, the time stamp output from the adder circuit 92 indicates the time that is delayed with respect to the time stamp of the tentative starting segment by the delay time corresponding to the value of the offset indication information.

The value of the offset indication information may be, for example, a value not smaller than the number that the time stamp counter counts during the period of (fixed delay time 40)+(maximum fluctuation 42). By thus setting the offset indication information, the time stamp output from the adder circuit 92 indicates the time that is delayed by (fixed delay time 40)+(maximum fluctuation 42) with respect to the transmission time at which the tentative starting segment was transmitted to the switch 21.

The comparison unit 93 compare the time stamp output from the adder circuit 92 with the count value output from the time stamp counter 75 that indicates the current time. Thus, the comparison unit 93 can determine whether the delay time corresponding to the value of the offset indication information has elapsed from the transmission time at which the tentative starting segment was transmitted to the switch 21.

If the time stamp output from the adder circuit 92 is equal to the count value output from the time stamp counter 75, the state machine 94 transitions from the "TS state" to the "RO state."

Figure 20:
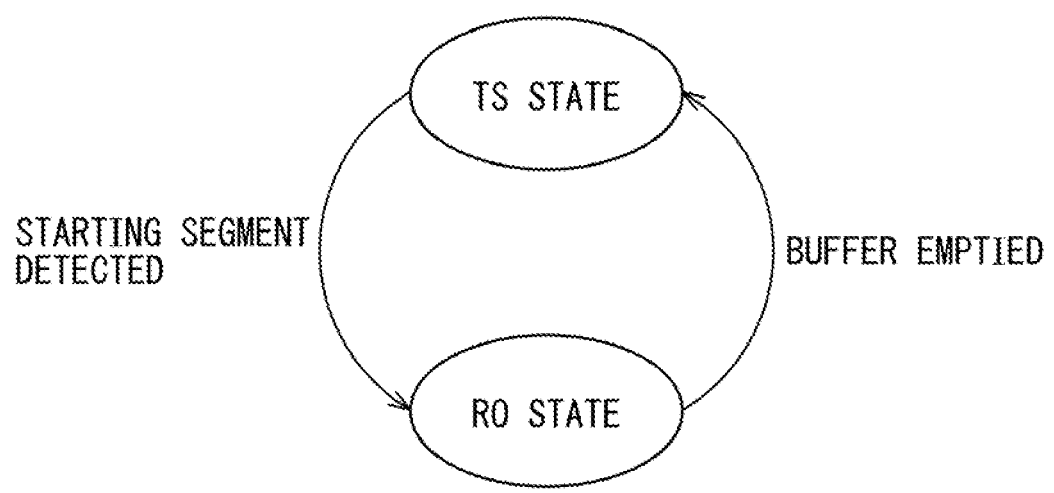
FIG. 20 is a state transition diagram of a state machine.

FIG. 20 is a state transition diagram of the state machine 94. The fact that the output of the adder circuit 92 is equal to the output of the time stamp counter 75 means that the period equal to (fixed delay time+maximum fluctuation) has elapsed from the transmission time at which the tentative starting segment was transmitted to the switch 21. Since there is no possibility that the segment data transmitted earlier than the tentative starting segment will subsequently arrive, the tentative starting segment is determined as the starting segment. Then, by determining that the starting segment has been detected, the state machine 94 makes a transition to the "RO state."

The state machine 94 receives the buffer state signal from the buffer management unit 74. When the reorder buffer 33-1 becomes empty, the state machine 94 transitions from the "RO state" to the "TS state." The state machine 94 outputs a state signal indicating the current state, the "RO state" or the "TS state", and supplies it to the read request signal generating unit 77.

Figure 21:
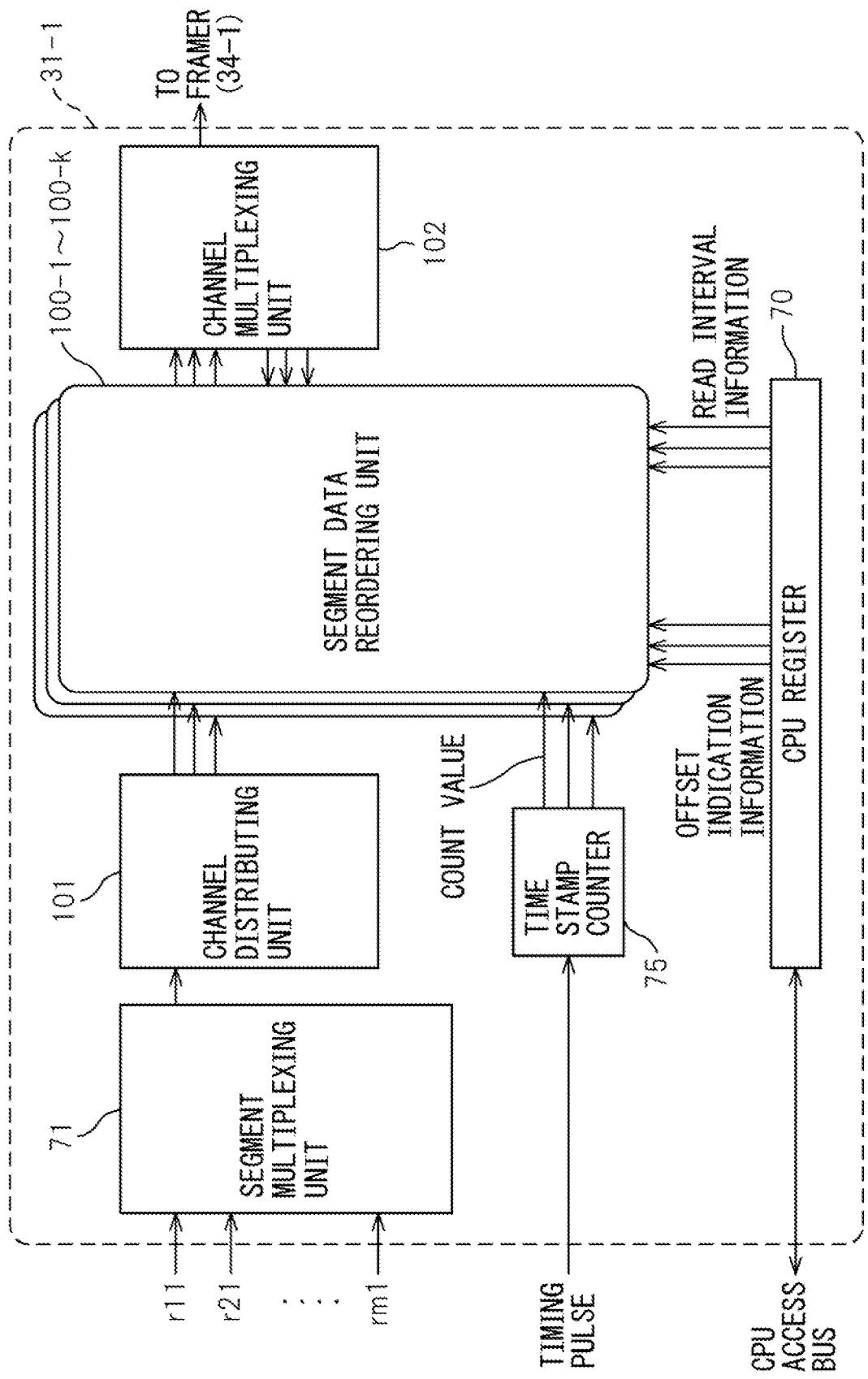
FIG. 21 is a diagram schematically illustrating the configuration of a second example of the egress switch interface.
Figure 22:
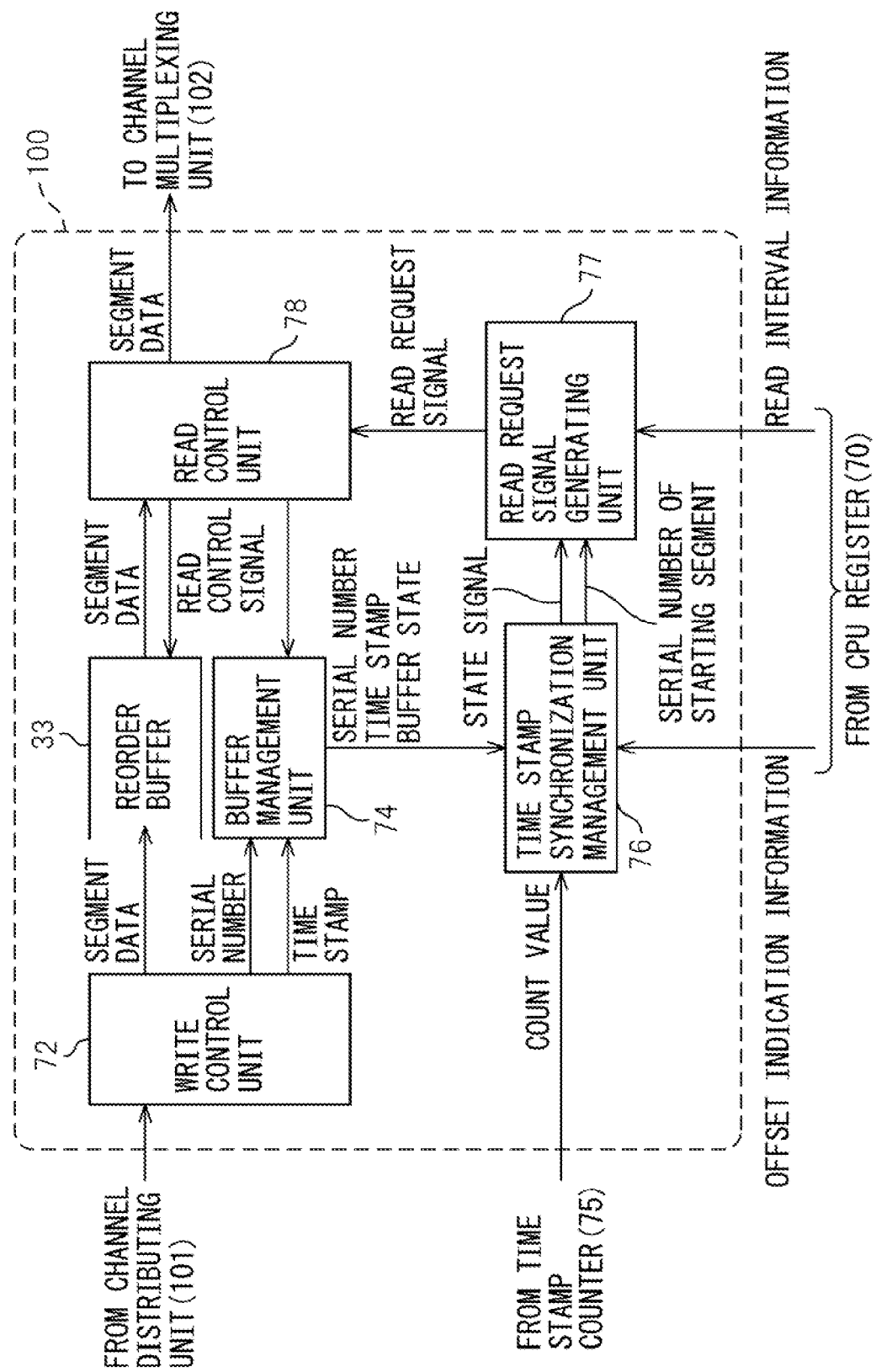
FIG. 22 is a diagram schematically illustrating the configuration of a segment data reordering unit.

If the ODU segments received by the switch interface 12-1 are signals flowing on a plurality of different channels, the segment data may be stored on a channel-by-channel basis in the reorder buffer 33. FIGS. 21 and 22 illustrate a configuration example of the switch interface for storing the segment data on a channel-by-channel basis in the reorder buffer 33.

FIG. 21 is a diagram schematically illustrating the configuration of a second example of the egress switch interface, and FIG. 22 is a diagram schematically illustrating the configuration of segment data reordering units 100-1 to 100-k. The switch interface 31 includes the plurality of segment data reordering units 100-1 to 100-k (hereinafter sometimes collectively referred to as the segment data reordering unit 100) for performing the reordering of the plurality of channels of segment data.

Each segment data reordering unit 100 includes a write control unit 72, a buffer management unit 74, a time stamp synchronization management unit 76, a read request signal generating unit 77, a read control unit 78, and a reorder buffer 33, each identical to the corresponding component described with reference to FIG. 16. The switch interface 31-1 further includes a channel distributing unit 101 and a channel multiplexing unit 102.

The channel distributing unit 101 distributes the switch segments, received from the segment multiplexing unit 71, to the respective segment data reordering units 100 on a channel-by-channel basis. The channel multiplexing unit 102 multiplexes the segment data output from the respective segment data reordering units 100, and supplies the multiplexed data to the framer 34-1.

Figure 23:
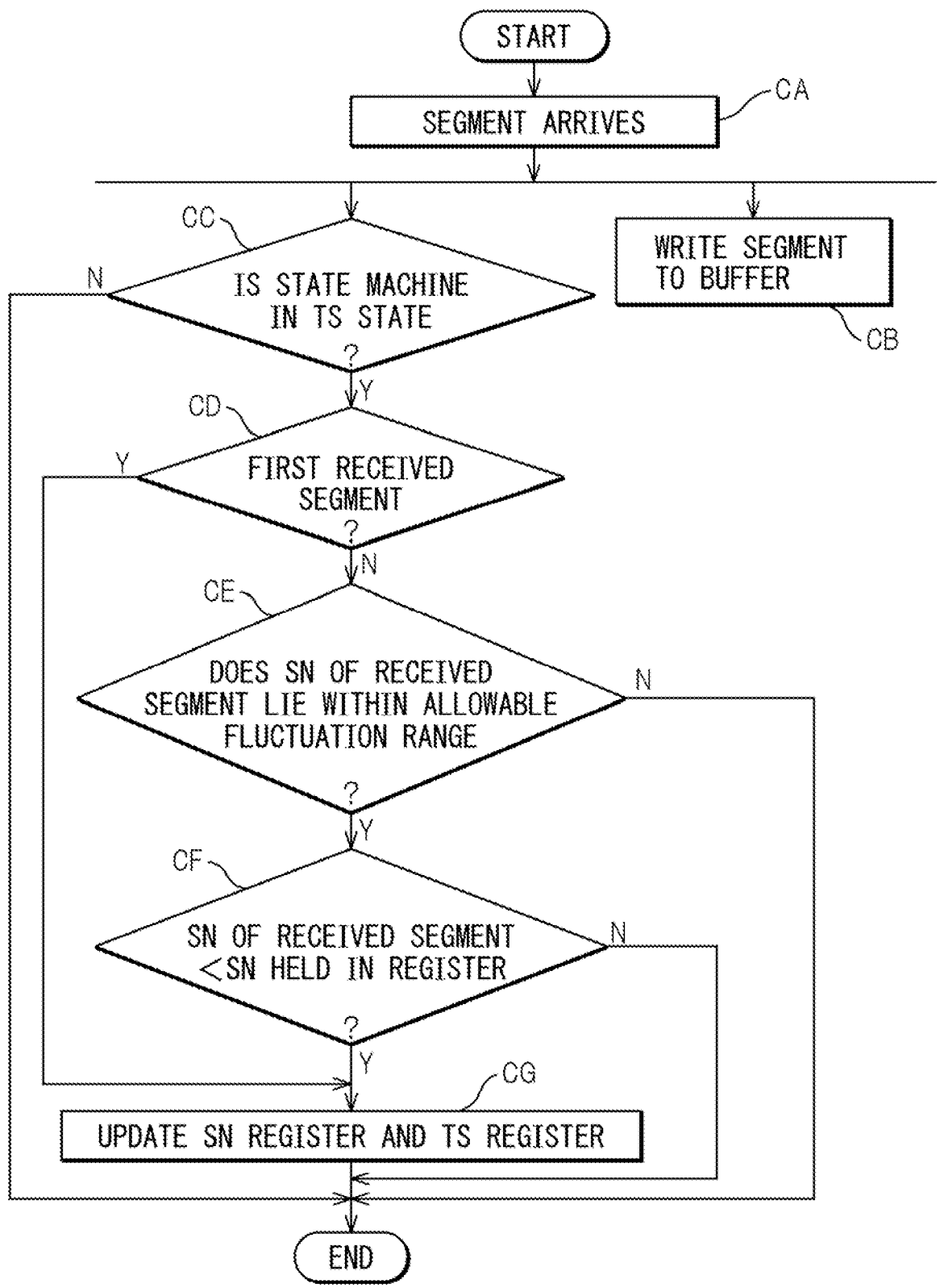
FIG. 23 is an explanatory diagram illustrating the starting segment detection process performed by the time stamp synchronization management unit.

FIG. 23 is an explanatory diagram illustrating the starting segment detection process performed by the time stamp synchronization management unit 76. In an alternative embodiment, the following operations CA to CG may be implemented as steps. In FIG. 23, "TS" represents the time stamp, and "SN" the serial number.

In operation CA, the segment multiplexing unit 71 receives each arriving switch segment. The segment multiplexing unit 71 supplies the switch segment to the write control unit 72.

The next operation CB and the subsequent operations CC to CG may be carried out simultaneously. Or, the operation CB may be carried out either before or after the operations CC to CG. In operation CB, the segment multiplexing unit 71 writes the segment data included in the received switch segment to the reorder buffer 33.

In operation CC, the serial number checking unit 90 in the time stamp synchronization management unit 76 checks whether the state machine 94 is in the "TS state" or not. If the state machine 94 is in the "TS state" (Y in operation CC), the process proceeds to operation CD. If the state machine 94 is not in the "TS state" (N in operation CC), the time stamp synchronization management unit 76 terminates the process.

In operation CD, the serial number checking unit 90 receives from the buffer management unit 74 the serial number stored in the header of the arriving switch segment. The serial number checking unit 90 checks whether the arriving switch segment is the first received switch segment after the switch interface 30-1 has been turned on or after the state machine 94 has made a transition to the "TS state." If the arriving switch segment is not the first received switch segment (N in operation CD), the process proceeds to operation CE. If the arriving switch segment is the first received switch segment (Y in operation CD), the process proceeds to operation CG.

In operation CE, the fluctuation monitoring unit 95 checks whether the difference between the received serial number and the value of the serial number register 97 lies within an allowable fluctuation range. If the difference between the received serial number and the value of the serial number register 97 lies within the allowable fluctuation range (Y in operation CE), the process proceeds to operation CF. If the difference between the received serial number and the value of the serial number register 97 does not lie within the allowable fluctuation range (N in operation CE), the time stamp synchronization management unit 76 sets the state machine 94 and the registers 97 and 98 back to their original states, i.e., the states immediately after power on, and the process is terminated. With the above operation of the fluctuation monitoring unit 95, a fault in the operation of the frame transmission apparatus 1 can be detected by detecting the arrival of an unexpected serial number.

In operation CF, the comparison unit 96 compares the received serial number with the value of the serial number register 97. If the received serial number is smaller than the value of the serial number register 97 (Y in operation CF), the process proceeds to operation CG. If the received serial number is not smaller than the value of the serial number register 97 (N in operation CF), the time stamp synchronization management unit 76 terminates the process.

In operation CG, the comparison unit 96 stores the received serial number in the serial number register 97 as the serial number of the tentative starting segment. Further, the time stamp information holding unit 91 updates the value of the time stamp register 98 by the updated time stamp of the tentative starting segment.

The monitoring performed by the fluctuation monitoring unit 95 in operation CE is not necessarily mandatory, and the processing of operation CE and the fluctuation monitoring unit 95 may be omitted. Further, the monitoring by the fluctuation monitoring unit 95 in operation CE and/or the comparison by the comparison unit 96 in operation CF may be performed by using the time stamp rather than the serial number. When using the time stamp, the serial number register 97 may be omitted.

Figure 24:
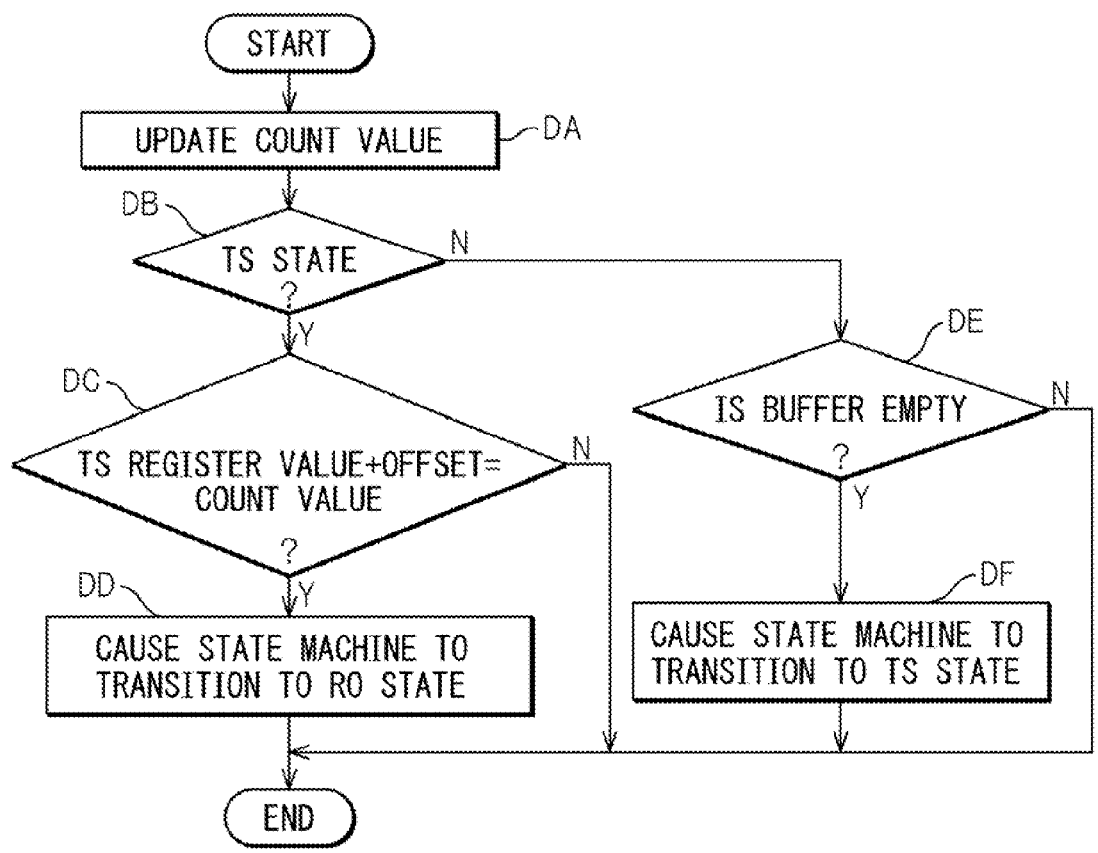
FIG. 24 is an explanatory diagram illustrating how the state of the state machine is changed.

FIG. 24 is an explanatory diagram illustrating how the state of the state machine 94 is changed. In an alternative embodiment, the following operations DA to DF may be implemented as steps. In FIG. 24, "TS register" means the time stamp register.

In operation DA, the time stamp counter 75 updates the count value to its initial value by receiving a timing pulse from the timing pulse generating unit 3.

In operation DB, the state machine 94 is checked to see whether it is in the "TS state" or not. If the state machine 94 is in the "TS state" (Y in operation DB), the process proceeds to operation DC. If the state machine 94 is not in the "TS state" (N in operation DB), the process proceeds to operation DE.

In operation DC, the comparison unit 93 compare the output of the adder circuit 92, i.e., the sum of the value of the time stamp stored in the time stamp register 92 and the value of the offset indication information, with the count value output from the time stamp counter 75. If the output of the adder circuit 92 is equal to the count value (Y in operation DC), the process proceeds to operation DD. If the output of the adder circuit 92 is not equal to the count value (N in operation DC), the process is terminated. In operation DD, the state machine 94 transitions from the "TS state" to the "RO state."

In operation DE, the state machine 94 determines whether the reorder buffer 33-1 is empty or not. If the reorder buffer 33-1 is empty (Y in operation DE), the process proceeds to operation DF. If the reorder buffer 33-1 is not empty (N in operation DE), the process is terminated. In operation DF, the state machine 94 transitions from the "RO state" to the "TS state."

Figure 25:
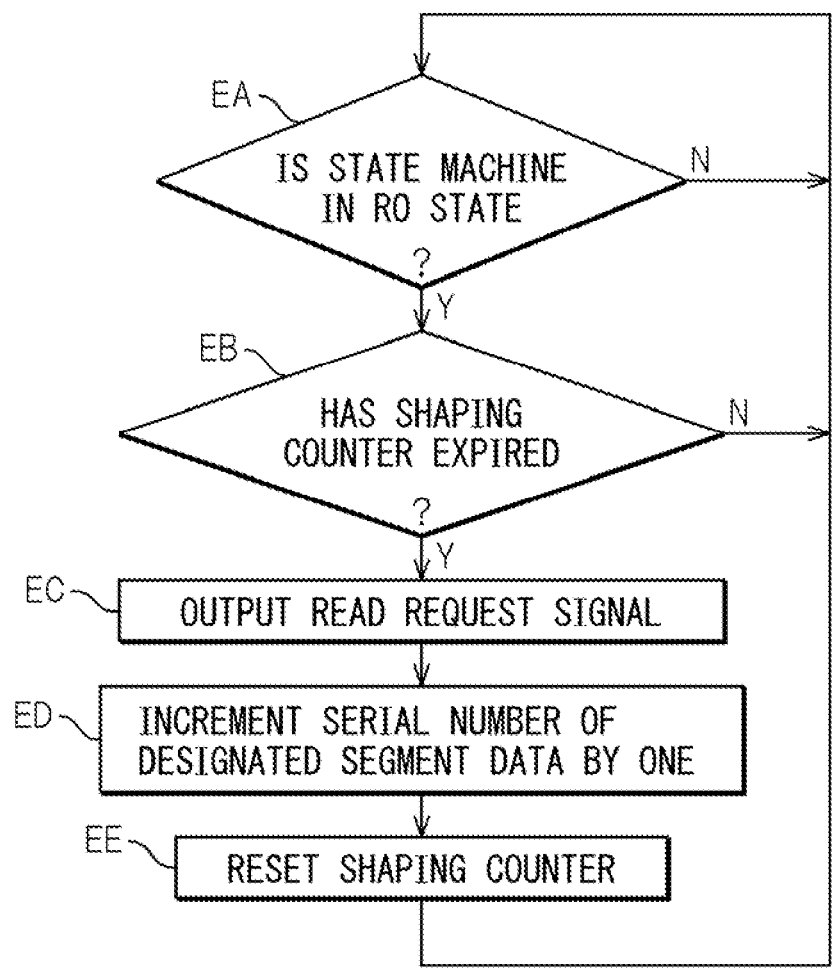
FIG. 25 is an explanatory diagram illustrating the process performed by a read request signal generating unit.

FIG. 25 is an explanatory diagram illustrating the process performed by the read request signal generating unit 77. In an alternative embodiment, the following operations EA to EE may be implemented as steps.

In operation EA, the read request signal generating unit 77 checks to see whether the value of the state signal indicating the state of the state machine 94 is the "RO state" or not. If the state machine 94 is in the "RO state" (Y in operation EA), the process proceeds to operation EB. If the state machine 94 is not in the "RO state" (N in operation EA), operation EA is repeated.

In operation EB, the read request signal generating unit 77 refers to the value of a shaping counter whose count value is incremented every determined time interval. The read request signal generating unit 77 determines whether the value of the shaping counter has expired, i.e., whether the value of the shaping counter has reached a predetermined threshold value. This threshold value is stored as the read interval information in the CPU register 70.

If the value of the shaping counter has expired (Y in operation EB), the process proceeds to operation EC. If the value of the shaping counter has not expired yet (N in operation EB), the process returns to operation EA.

In operation EC, the read request signal generating unit 77 outputs a read request signal for reading out the serial number of the designated segment data. At the time immediately after the state machine 94 has made a transition from the "TS state" to the "RO state," the read request signal generating unit 77 outputs as the serial number of the designated segment data the serial number of the starting segment output from the serial number checking unit 90.

In operation ED, the read request signal generating unit 77 increments the serial number of the designated segment data by one. In operation EE, the read request signal generating unit 77 resets the value of the shaping counter.

FIGS. 26A to 26H are explanatory diagrams of the segment data reading method according to the embodiment. FIG. 26A is a time chart depicting the count value output from the ingress time stamp counter 60, and FIG. 26B is a time chart depicting the switch segments output from the switch interface 12.

FIG. 26C is a time chart depicting the switch segments input to the switch interface 31, FIG. 26D is a time chart depicting the value of the serial number register 97, and FIG. 26E is a time chart depicting the value of the time stamp register 98.

FIG. 26F is a time chart depicting the value obtained by adding the value of the offset indication information to the value of the time stamp register 98, and FIG. 26G is a time chart depicting the count value output from the egress time stamp counter 75. FIG. 26H is a time chart depicting the switch segments output from the read control unit 78.

The rectangles in FIG. 26B indicate the switch segments, and the numbers in the rectangles indicate the serial numbers of the respective switch segments. Consider the case where the switch segment of serial number "1" is taken as the starting segment and the switch segments of serial numbers "1" and "2" are transmitted from the switch interface 12 to the switch at time t1 and time t2, respectively.

As depicted in FIG. 26A, since the count values output from the time stamp counter 60 at time t1 and time t2 are "a" and "b", respectively, the time stamps of values "a" and "b" are stored in the header information of the respective switch segments of serial numbers "1" and "2".

As depicted in FIG. 26C, the switch segments of serial numbers "1" and "2" are received by the switch interface 31 at time t4 and time t3, respectively. As depicted in FIG. 26D, the value "2" is stored in the serial number register 97 at time t3, and the value of the serial number register 97 is updated to "1" at time t4.

Further, as depicted in FIG. 26E, the value "b" is stored in the time stamp register 98 at time t3, and the value of the time stamp register 98 is updated to "a" at time t4.

Assume that the period of (fixed delay time 40)+(maximum fluctuation 42) corresponds to the difference between "a" and "d" and that the values output from the time stamp counter 60 for the switch segments transmitted during the period from "a" to "e" are equally spaced apart, and consider the case where the value of the offset indication information indicates "d-a". Then, as depicted in FIG. 26F, the sum of the value of the offset indication information and the value of the time stamp register 98 is calculated at time t3 as "e" from the value obtained by advancing "b" by "d-a" (="e-b"), that is, from ("e-b"+"b"), and at time t4 as "d" from ("d-a"+"a").

As a result, at time t5 when the period of (fixed delay time 40)+(maximum fluctuation 42) has elapsed from t1 at which the starting segment was transmitted, the sum of the value of the offset indication information and the value of the time stamp register 98 becomes identical with the count value of the time stamp counter 75. This is illustrated in FIGS. 26F and 26G.

At time t5, the read request signal generating unit 77 begins to generate the read request signal at time intervals T indicated by the read interval information. As a result, as depicted in FIG. 26H, the segment data begins to be output at time t5.

According to the present embodiment, the residence time of the segment data in the reorder buffer 33-1 is reduced. When the frame transmission apparatus 1 is a transmission apparatus that performs switching of OTN frames, since the maximum allowable delay time is defined by the standard, the reduced residence time in the reorder buffer 33-1 facilitates the design of the frame transmission apparatus 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A signal processing circuit for controlling reading of segment data from a buffer in which a plurality of segment data generated by dividing a frame and received via a plurality of switches which direct each of said segment data to a designated destination are stored, comprising:
   a start detecting unit which detects a starting segment representing the first transmitted segment data to one of said plurality of switches among the segment data received after said buffer has emptied;
   a transmission time acquiring unit which acquires a transmission time at which said starting segment was transmitted to said one of said plurality of switches; and
   a read timing control unit which determines, once a period has elapsed from the transmission time of said starting segment, a read timing for reading said segment data from said buffer, such that the read timing for reading each subsequent one of said segment data arrives at a constant frequency.

2. The signal processing circuit as claimed in claim 1, wherein said read timing control unit determines that the read timing for reading said starting segment has arrived when the period has elapsed from the transmission time of said starting segment.

3. The signal processing circuit as claimed in claim 1, wherein based on segment data transmission order information included in header information appended to each of said segment data, said start detecting unit detects as said starting segment the segment data having the highest transmission order among said segment data stored in said buffer.

4. The signal processing circuit as claimed in claim 1, wherein based on segment data transmission time information included in header information appended to each of said segment data, said start detecting unit detects as said starting segment the segment data whose transmission time is the oldest among said segment data stored in said buffer.

5. The signal processing circuit as claimed in claim 2, further comprising a state machine which makes a transition between a first state and a second state, wherein said state machine makes a transition from said first state to said second state when said buffer has emptied, and from said second state to said first state when the timing for reading said starting segment has arrived.

6. A switch interface unit comprising:
   a receiving unit which receives segment data from a plurality of switches directing said segment data to a designated destination;
   a buffer in which a plurality of segment data generated by dividing a frame and received via said plurality of switches is stored;
   a start detecting unit which detects a starting segment representing the first transmitted segment data to one of said plurality of switches among the segment data received after said buffer has emptied;
   a transmission time acquiring unit which acquires a transmission time at which said starting segment was transmitted to said one of said plurality of switches; and
   a read timing control unit which determines, once a period has elapsed from the transmission time of said starting segment, a read timing for reading said segment data from said buffer, such that the read timing for reading each subsequent one of said segment data arrives at a constant frequency.

7. A frame transmission apparatus comprising:
   a frame receiving unit which receives a frame;
   a frame dividing unit which divides said received frame into said plurality of segment data;
   a plurality of switches which direct segment data to a designated destination;
   a distributing unit which distributes said plurality of segment data to said plurality of switches;
   a receiving unit which receives said plurality of segment data said plurality of switches;
   a buffer in which said plurality of segment data received via said plurality of switches is stored;
   a start detecting unit which detects a starting segment representing the first transmitted segment data to one of said plurality of switches among the segment data received after said buffer has emptied;
   a transmission time acquiring unit which acquires a transmission time at which said starting segment was transmitted to said one of said plurality of switches; and
   a read timing control unit which determines, once a period has elapsed from the transmission time of said starting segment, a read timing for reading said segment data from said buffer, such that the read timing for reading each subsequent one of said segment data arrives at a constant frequency.

8. A method for reading segment data from a buffer in which a plurality of segment data generated by dividing a frame and received via a plurality of switches which direct each of said segment data to a designated destination are stored, comprising:
   detecting a starting segment representing the first transmitted segment data to one of said plurality of switches among the segment data received after said buffer has emptied;
   acquiring a transmission time at which said starting segment was transmitted to said one of said plurality of switches; and
   determining, once a period has elapsed from the transmission time of said starting segment, a read timing for reading said segment data from said buffer, such that the read timing for reading each subsequent one of said segment data arrives at a constant frequency.

\* \* \* \* \*